United States Patent
Eichenlaub

(10) Patent No.: US 8,355,019 B2
(45) Date of Patent: Jan. 15, 2013

(54) 3D OPTICAL ILLUSIONS FROM OFF-AXIS DISPLAYS

(75) Inventor: Jesse B. Eichenlaub, New Penfield, NY (US)

(73) Assignee: Dimension Technologies, Inc., Rochester, NY (US)

( * ) Notice: Subject to any disclaimer, the term of this patent is extended or adjusted under 35 U.S.C. 154(b) by 1062 days.

(21) Appl. No.: 11/934,265

(22) Filed: Nov. 2, 2007

(65) Prior Publication Data

US 2009/0115783 A1 May 7, 2009

(51) Int. Cl.
*G06T 15/00* (2006.01)

(52) U.S. Cl. .......... 345/419; 345/581; 345/633; 348/42; 348/47; 348/51

(58) Field of Classification Search .................. 345/419, 345/473; 348/47, 51; 359/248; 381/61; 382/154

See application file for complete search history.

(56) References Cited

U.S. PATENT DOCUMENTS

| | | | |
|---|---|---|---|
| 1,592,034 A | 7/1926 | Macy | |
| 6,353,457 B2* | 3/2002 | Uomori et al. | 348/47 |
| 6,388,666 B1* | 5/2002 | Murray | 345/473 |
| 6,389,236 B1 | 5/2002 | Western | |
| 6,614,427 B1* | 9/2003 | Aubrey | 345/419 |
| 2003/0071822 A1* | 4/2003 | Lake et al. | 345/589 |
| 2005/0046700 A1* | 3/2005 | Bracke | 348/218.1 |
| 2005/0185051 A1* | 8/2005 | Perlin | 348/51 |
| 2005/0244050 A1* | 11/2005 | Nomura et al. | 382/154 |
| 2005/0264651 A1* | 12/2005 | Saishu et al. | 348/51 |
| 2005/0281411 A1* | 12/2005 | Vesely et al. | 381/61 |
| 2006/0083421 A1* | 4/2006 | Weiguo et al. | 382/154 |
| 2006/0087734 A1* | 4/2006 | Weissman | 359/462 |
| 2006/0252979 A1* | 11/2006 | Vesely et al. | 600/27 |
| 2006/0262376 A1* | 11/2006 | Mather et al. | 359/248 |
| 2006/0266135 A1* | 11/2006 | Nishikawa et al. | 73/866.3 |
| 2007/0002037 A1* | 1/2007 | Kuroki et al. | 345/418 |

\* cited by examiner

*Primary Examiner* — Xiao M. Wu
*Assistant Examiner* — Phi Hoang
(74) *Attorney, Agent, or Firm* — Brown & Michaels, PC

(57) ABSTRACT

A 3D viewing system captures offset images from off-axis camera perspectives inclined to a normal of base plane of a scene that includes one or more objects projecting from the base plane. The offset images, which take a planar form, are displayed from a display surface at an off-axis viewing perspective that is inclined to a normal of the display surface similar to the inclination of the off-axis camera perspective to the normal of the base plane. The offset images undergo a distortion to counteract a keystone distortion associated with the off-axis viewing perspective. The base plane of the scene is oriented parallel to the display surface, and the objects projecting from the base plane appear to project from the display surface.

23 Claims, 17 Drawing Sheets

3D OPTICAL ILLUSIONS FROM OFF-AXIS DISPLAYS

BACKGROUND OF THE INVENTION

1. Field of the Invention

The invention relates to off-axis displays arranged for producing three-dimensional (3D) illusions that appear to project beyond surfaces of the displays and to methods of capturing, processing, and displaying images for 3D projection.

2. Description of Related Art

Three-dimensional (3D) imaging methods have been in use for many years. Among these, autostereoscopic 3D imaging systems, which do not require the use of visual aids such as cross-polarizing eyeglasses, have become increasing popular. For example, 3D holograms and lenticular displays are now commonplace.

Addressable displays capable of displaying multiple or even moving 3D images include both volumetric and parallax displays. Volumetric display systems collect three-dimensional image data throughout a volume of space and display the image data as a series of image slices through different depths of the volume. The resulting images are visible through a wide range of viewing angles but generally do not provide appropriate occlusion or shading for objects obscured by other objects as required for realistic viewing of scenes. The optical and mechanical technologies required for producing such images also tend to be quite expensive.

Parallax displays present directionally varying information so that slightly different images are presented to each of an observer's eyes. For example, parallax displays can present slightly offset images of the same scene to an observer's eyes mimicking the natural offset of the observer's eyes and exploiting the predispositions of the observer's mental processing of such offset views for acquiring three-dimensional information.

Generally, the known parallax displays present 3D images in standard viewing orientations for on-axis viewing. For example, the image display surface is typically placed in a vertical orientation normal to the line of sight of a typical standing or seated observer. Only limited depth is available receding into the background of a scene. In addition, known parallax displays have a limited capability for projecting dimensional perspective forward of the plane of the image display surface. These standard parallax methods have been in the marketplace and practiced in their current forms for approximately 100 years and as such do not provide a new and unique display opportunities for potential commercial users.

The creation of 2D and 3D images that are designed to have correct perspective when viewed from angles far from the normal to the image surface have long been known to the art. A 2D painting technique called anamorphosis, which is designed to produce this effect, dates back to the Renaissance. Objects are painted so that they appear to have correct perspective when viewed from far off to one side, instead of straight on as in a normal panting. In the modern era such paintings are sometimes created on sidewalks or public squares by artists and are rendered so a person walking toward them along a sidewalk will, at least for a moment, see a correctly proportioned image of an object or person sitting on the sidewalk in front of them. Trompe l'oeil artists employ the same techniques in public art created on vertical surfaces like walls and the faces of buildings.

Stereo 3D images that employ these techniques began to appear in the early 1900s. A drawing of a cylinder, designed for viewing with red and green glasses, was published in the book Les Anaglyphes Geometriques in 1912. An early U.S. Pat. No. 1,592,034 (Macy, 1926) describes a simplified variation of this technique applied to horizontally oriented stereo images. Later in the century several books were published that contained stereo anaglyph drawings and in some cases instructions on how to draw them. These books include Descriptive Geometry with Three Dimensional figures by Imre Pal (1959), Engineering Graphics and Descriptive Geometry in 3-D by G. F. Pearce (1977), Phantogram Perspective Charts by Raymond Nicyper (1979) and Stereo Drawing by Artheur Girling (1990). Various books continue to be published to the present day which include these types of anaglyph stereo drawings and photographs. The techniques used to create these images came to be known as "Stereo anamorphosis" and the images themselves are now commonly referred to, at least in the US, by the popular term "phantograms."

People who view phantograms are usually impressed by the ability of such images to create a compelling illusion that a real object is sitting in front of them on top of the image surface or extending forward from a wall mounted display. The commercial possibilities of such an illusion for advertising and display purposes was obvious from the beginning. Macy's patent discloses the use of such images to display pictures of items in a store.

In 1993 Owen Westin created what is believed to by the first photographic phantogram by distorting two images taken with left and right eye cameras situated off angle from their subject. Due in part to Owen Westin's exhibition of his creations at a National Stereographic Society convention, and publication of a phantogram image on the cover of the ISU's summer 1998 issue of Stereoscopic Journal, interest in and experimentation with phantograms blossomed in the 1990s. Many hobbyists experimented with the technique by distorting stereo photographs taken from off axis. Owen Westin obtained U.S. Pat. No. 6,389,286 covering some methods of creating anaglyph phantograms in May of 2002. During the 1990s another photographer, Steve Aubrey, began experimenting with the use of computer based image manipulation programs like Photoshop to perform the distortions necessary to create phantogram images from photographs taken with two cameras or stereo pairs of computer generated images. Steve Aubrey obtained U.S. Pat. No. 6,614,427 in September of 2003 covering distortion methods for the creation of phantograms from digital images.

Since 2005, Toshiba has exhibited a fly's eye lens based autostereoscopic display with a sufficiently wide viewing angle that displays images that can be viewed by people standing at a countertop or sitting at a table and looking down at a version of the display that lays flat. Due to a limited number of 3D perspective views, objects can only extend a few inches above or below the display surface.

Past efforts at producing phantogram images have almost universally used conventional printed or electronic media that must be viewed with 3D glasses to see the images. Autostereoscopic displays have been used experimentally by Toshiba, DTI and a few others. However, there are certain design improvements that can be made to autostereoscopic displays that will make them more easily viewable, and the images more easily seen, from off axis instead of the usual on axis positions. Other improvements can make them more suitable for use in playing electronic games using phantogram images. Furthermore, autostereoscopic display projection systems can be designed to show very large phantogram images to large groups of people. Previous methods of generating stereoscopic images from image pairs have relied on distorting the images obtained from pairs of real or virtual cameras (the latter used in generating computer drawn images). A method of rendering computer generated images that does not require further distortion of the images, and is compatible with existing rendering software packages would save both rendering time and human effort and thus be of benefit.

SUMMARY OF THE INVENTION

The invention in one or more of its preferred embodiments creates three-dimensional (3D) images that appear to project from an image display surface. For example, the projected images can be arranged to give the impression of a three-dimensional object in a vertical up-right orientation relative to a horizontal image display surface when viewed from a position that is both horizontally offset and vertically elevated with respect to the display surface. Alternatively, the display surface can be oriented in a non-horizontal plane for projecting 3D images in an orientation normal to the display when viewed from an intermediately inclined perspective.

Preferably, the observer's line of sight is inclined by approximately 45 degrees from a normal to the display surface, but a wide range of viewing angles are possible. The projected images, which include separate images for each of an observer's eyes, can give the impression that products, characters, and other imageable objects are standing on top of the display or a surface, such as a countertop, on which the display is resting.

Two or more offset images of the same object are captured from off-axis camera perspectives and systematically distorted before being displayed from a display surface along a similar off-axis viewing perspective. The offset images can be captured by cameras on film or in digital sensor arrays, or can be acquired from virtual cameras, such as computer image generation programs. The distortion, which can be accomplished optically or by data manipulation, preserves in the off-axis viewing perspective of the offset images from the display surface the relative angles subtended by objects in the off-axis camera perspectives of the original scene. Thus, the offset images captured by cameras (real or virtual) operating at off-axis perspectives to a scene are distorted to compensate for distortions accompanying the intended off-axis viewing of the images from the display surface. The distorted offset images are displayed from a display so that when the displayed images are viewed from the intended off-axis viewing perspective, an illusion of real objects extending outwards from the display surface is created.

DETAILED DESCRIPTION OF THE INVENTION

Figure 1:
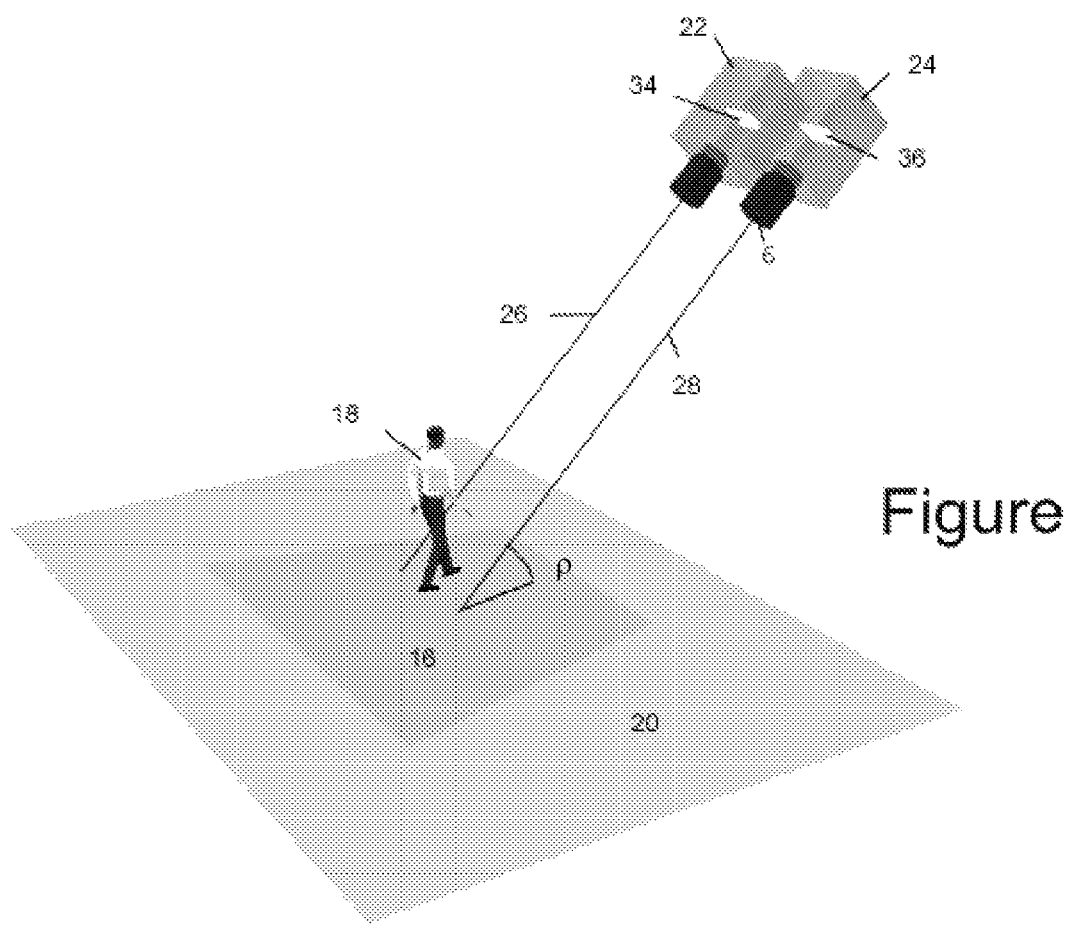
FIG. 1 is a perspective view showing a camera arrangement for capturing offset images of a scene from off-axis camera perspectives.

Two or more offset images of the same object are captured from off-axis camera perspectives and displayed from a display surface along a similar off-axis viewing perspective. The offset images can be captured by cameras on film or in digital sensor arrays, or can be acquired from virtual cameras, such as computer image generation programs. The images are displayed from a display so that when the displayed images are viewed from the intended off-axis viewing perspective, an illusion of real objects extending outwards from the display surface is created.

The desired 3D effects in general can be created by the usual stereoscopic or other parallax display of offset images. However, the apparent projections of imaged objects away from the surface of the display (e.g., above or below the display surface) at off-axis angles of view are made possible by either manipulation (e.g., distortion) of the offset images to produce a scene with correct proportions when viewed from off axis, or by rendering the scenes in such a way that the correct proportions are produced as the images are rendered, thus eliminating the need for distortion. For example, in the cameras' original off-axis view of the scene, object features of greater height above a base plane of the scene can be expected to subtend larger angles of view than corresponding object features of lesser height because of their relative proximities to the cameras. Similarly, object features located closer to a front of the base plane can be expected to subtend larger angles than corresponding object features located closer to a back of the base plane for the same reason. However, if the offset images recorded by the cameras were displayed from a display surface without change at the intended off-axis angle of view, the observed object feature size variation with height would be diminished and the observed object feature size variation with location would be further increased. The off-axis camera imaging and display viewing angles are preferably similar so that the imaged feature size variations, which provide clues for 3D imaging, are consistent with the feature size variations expected for the same scene in the direction of view.

For many applications, off-axis camera imaging angles and off-axis display viewing angles of approximately 30 to 60 degrees are used. The viewing perspective is preferably inclined to the normal of the display surface through an angle similar to an angle at which the camera perspectives are inclined to the normal of the base plane. The preferred inclination angle of the camera and viewing perspectives is around 45 degrees so that variations in object elevation and near-to-far position have substantially equal ranges within the display. At lower off-axis angles of view (i.e., approaching the display normal), larger ranges of object height but smaller ranges of front to back locations can be depicted. At higher off-axis angled of view, less height but a greater range of front-to-back locations can be depicted.

Preferably, computer software and electronics is used to render images captured by off-axis virtual cameras in such a way that the separate images of a scene produce the desired vertical image illusion when displayed from a horizontally oriented display surface. More broadly speaking, the image display can produce an illusion of an object extending outwardly or inwardly from the display surface when the display is oriented in an off-axis perspective to the observer similar to the off-axis perspective at which the images of the object are acquired.

For improving efficiency, conventional parallax image displays, which tend to project light normal to their display surfaces, can be modified to project light at the intended off-axis viewing angle (e.g., 45 degrees). For example, a light-directing film can be overlaid on the display or mounted against a backlight of the display for projecting larger amounts of light in the preferred viewing direction.

Conventional image separators within the parallax displays are also preferably modified to better accommodate off-axis viewing. The image separators that direct the offset images in slightly different directions to the offset eyes of observers generally include directional barriers or lens arrays mounted in front of the displays. The ideal spacing distance between the image separators and the image-reproducing plane of the displays is a function of a number of variables including the viewing distance, pixel pitch in the image-reproducing plane, the refractive index of the spacing, and the intended widths (i.e., angular spans) of the separate viewing zones. In addition, the ideal spacing distance varies with the viewing angle. Accordingly, the spacing between the image separator and the image-producing plane is preferably adjusted to accommodate the intended viewing angle.

However, the viewing angle itself varies between the top and bottom (i.e., near and far) boundaries of the display. For example, the viewing angle (as measured from the display normal) is larger toward the top boundary and smaller toward the bottom boundary. Thus, the ideal spacing distance between the image separator and the image-producing plane varies between the top and bottom boundaries of the display. More particularly, the spacing distance varies along a curve, i.e., nonlinearly, with increasing distance and viewing angle. A bowed image separator for exactly meeting these spacing requirements is difficult to manufacture. However, a planar image separator inclined for a best fit with the desired spacing variation provides a good approximation for improving off-axis viewing conditions One version of the invention as a method of producing a 3D projection illusion from a display inclined to a direction of view includes (a) rendering offset images of a scene, containing one or more objects projecting away from a base plane of the scene, using cameras that are pointed parallel to the normal of the base plane of the scene but are considerably offset from the normal through the center of the base plane of the scene, and (b) displaying the offset images at a viewing perspective inclined to a normal of a surface of the display from which the offset images appear to be projected. This will result in computer generated images that do not require further distortion for viewing in the correct perspective from an angle that is off axis to the normal. This type of rendering can be accomplished using many off the shelf computer modeling and animation programs.

It is also possible to incorporate 3D images and animations that are designed for presentation on normal monitors designed for on axis viewing by using the 3D images and animations as textures on flat surfaces that are rendered within a 3D scene that is designed for off axis viewing.

The display can be mounted in a horizontal orientation so that the elevation (e.g., height) variations of the one or more objects appear to project vertically from a surface of the display when the display surface is viewed from the off-axis viewing perspective that is similar to the off-axis camera perspectives at which the offset images are captured. Light emitted from the display is preferably redirected through an angle so that additional light propagates from the display in the off-axis direction of view.

The offset images can include a first set of offset images captured from a first set of off-axis camera perspectives and a second set of offset images captured from a second set of off-axis camera perspectives. Both sets of offset images can be alternately displayed so that height variations of objects within each of the two sets of offset images appear to project away from the surface of the display when the display surface is viewed from the first and second viewing perspectives. Shutters interrupting views of the display from the first and second viewing perspectives can be alternately opened and closed in conjunction with alternately displaying of the first and second sets of distorted offset images. Preferably, the display is mounted in a horizontal orientation, and the shutters are located at opposite ends of the display for interrupting the first and second perspectives. A horizontally oriented display of this sort can be used for two-player computer games in which each player is shown a different 3D scene.

A camera arrangement 10 is shown in FIGS. 1-4 for capturing offset images 12 and 14 of a scene 16 containing one or more objects 18 projecting away from a base plane 20. A pair of cameras 22 and 24 captures the images 12 and 14 along off-axis lines of sight 26 and 28 (i.e., the optical axes of the cameras) that are inclined to a normal 30 of the base plane 20. The off-axis lines of sight 26 and 28 shown in the drawing figures are inclined to the normal 30 through angle "ρ" by approximately 45 degrees, but the offset images 12 and 14 can be captured from a wide range of perspectives including inclination angles "ρ" ranging from 30 degrees to 60 degrees.

Although the cameras 22 and 24 are depicted as real cameras of the type used to record still, movie, or video images on photographic film, digital media, or analog video tape, the depicted cameras 22 and 24 could be replaced by virtual cameras of the type used by computer image rendering or animation software. The two cameras 22 and 24, whether real or virtual, are preferably spaced apart in a direction that is parallel to the base plane 20 and that models the eye spacing of an observer. In addition, the off-axes lines of sight 26 and 28 of the two cameras 22 and 24 are preferably oriented parallel to each other. Additional, preferably equally spaced cameras, can be aligned parallel to the base plane 20 with their parallel lines of sight 26 and 28 sharing overlapping fields of view for collectively capturing the scene 16.

Figure 2:
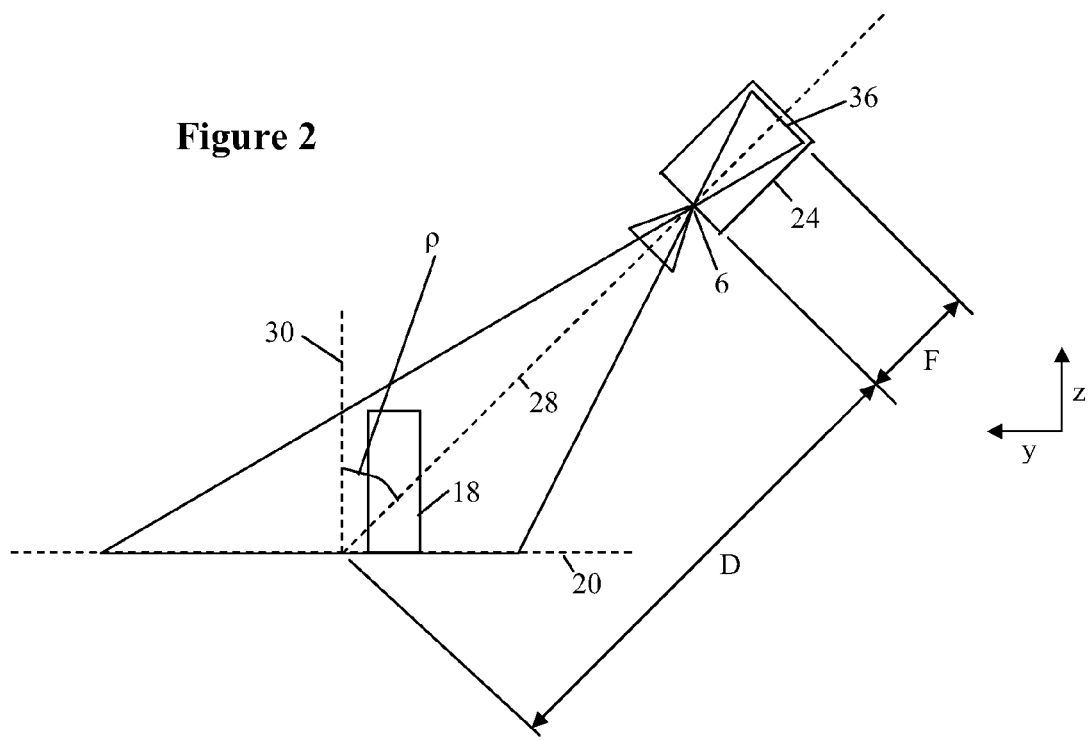
FIG. 2 is a schematic side view of the camera arrangement for capturing the offset images of an object projecting above a base plane of the scene.
Figure 3:
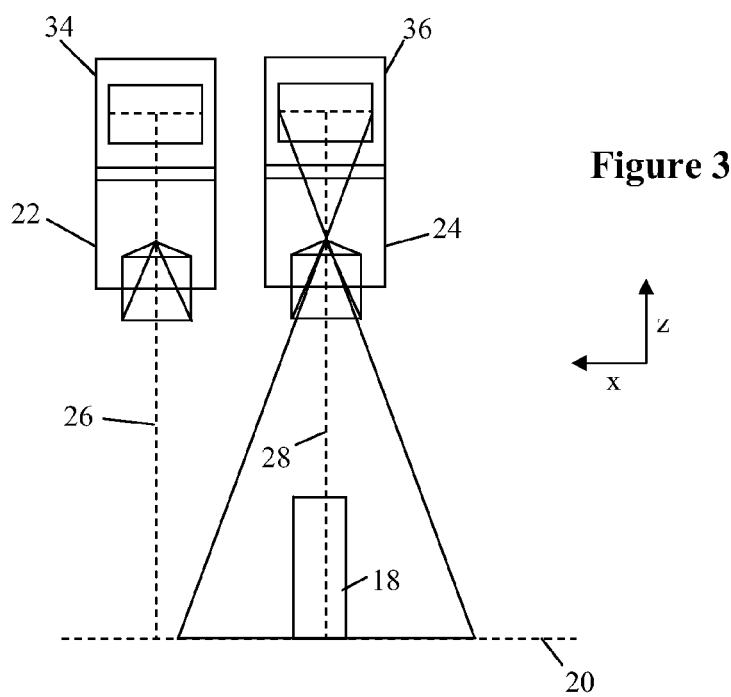
FIG. 3 is a schematic front view of the camera arrangement for capturing the offset images of the object projecting above a base plane of the scene.
Figure 4:
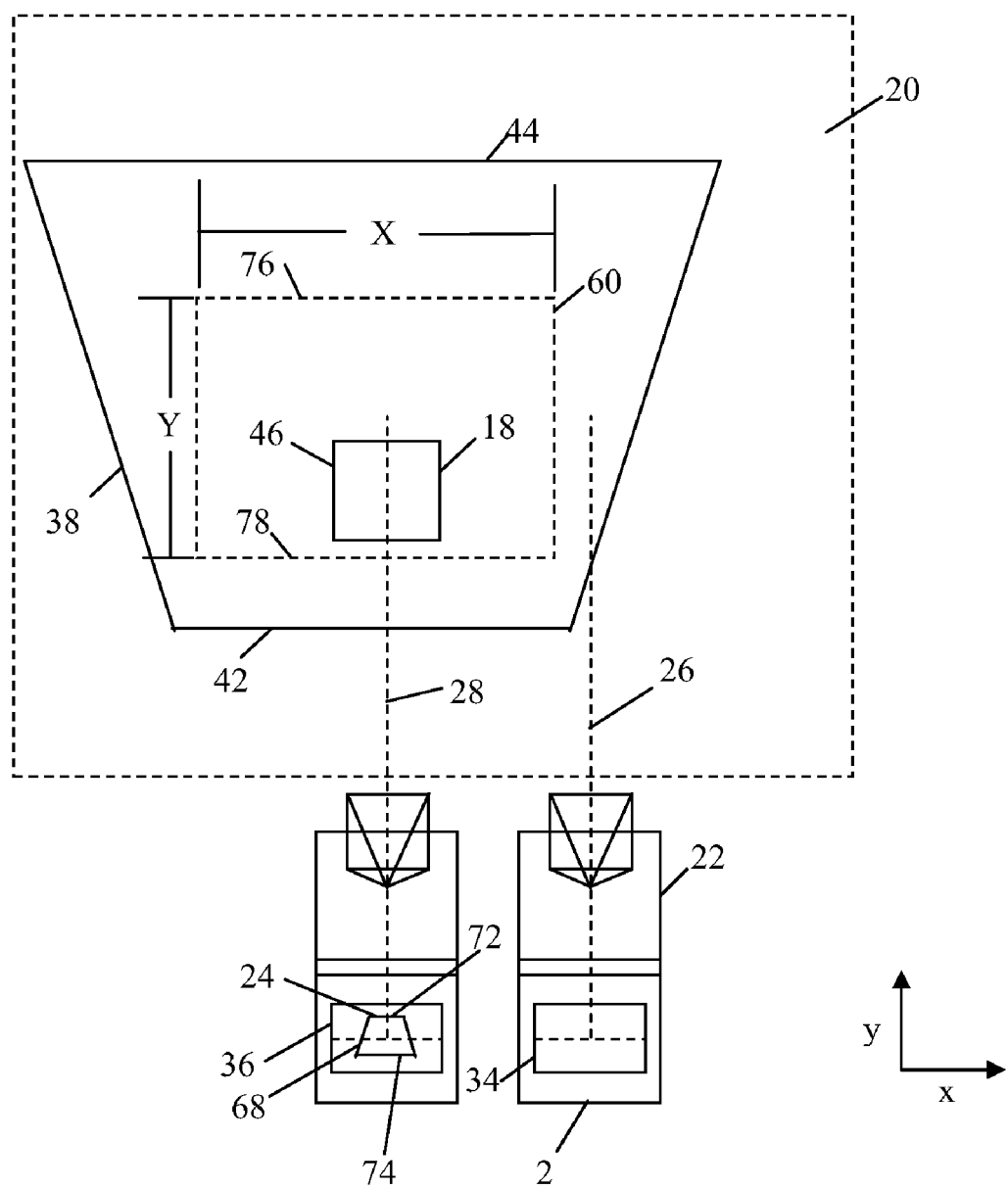
FIG. 4 is a schematic top view of the camera arrangement taken normal to the base plane of the scene.

For reference purposes, three orthogonal axes "x", "y", and "z" are defined as shown in FIGS. 2-4. The "z" axis extends vertically above the base plane 20. The "x" and "y" axes extend orthogonally along the base plane 20. The off-axis lines of sight 26 and 28 extend true length in vertical "y-z" planes as shown in FIG. 2. FIGS. 3 and 4 show the true-length offset between the parallel lines of sight 26 and 28 in both the "x-z" plane and the "x-y" plane.

The base plane 20 can correspond to a floor or other horizontal surface at the base of an object such as the object 18. Alternatively, the base plane 20 can be a purely imaginary plane above or below the floor or other referenced part of the scene 16. In any case, the base plane 20 preferably represents the plane within the scene 16 that appears to inhabit the surface of a display device, such as the surface 52 of display 50 shown in FIGS. 5 and 6.

The offset images 12 and 14 are generally captured by the cameras 22 and 24 within rectangular areas 34 and 36 of the cameras' image planes, which in the case of real cameras are frames of film or rectangular arrays of photosensitive electronic detectors such as CCD (charge coupled diode) chips. In the case of virtual cameras, the rectangular areas 34 and 36 occupy abstract sections of planes to which imaginary rays from a virtual base plane can be mathematically traced to calculate brightness and color values at each of many points. The rectangular areas 34 and 36 of the cameras' image planes are ideally oriented perpendicular to the cameras' lines of sight 26 and 28 (i.e., the optical axes of the cameras 22 and 24), and therefore, the rectangular areas 34 and 36 are inclined to the base plane 20 of the captured scene 16.

Given that the lines of sight 26 and 28 of the cameras 22 and 24 are inclined to the base plane 20 of the scene 16, the fields of view of the base plane 20 captured by the rectangular areas 34 and 36 of the cameras' image planes have a trapezoidal form. As shown in FIG. 4, the field of view 38 of the camera 22 has a trapezoid form with a base line 42 that is narrower than a parallel top line 44. The trapezoidal fields of view of the cameras 22 and 24 are displaced relative to one another, each being centered on the line of sight 26 or 28 of its camera 22 or 24. Conversely, a rectangular-shaped area 46 (corresponding to a footprint of the object 18) on the base plane 20, as also shown in FIG. 4, is imaged onto the rectangular areas 34 and 36 of the cameras 22 and 24 as a trapezoidal shaped area. Imaged dimensions of the object 18 recede with distance from the cameras 22 and 24. For example, the angle subtended by a top of the object 18 is larger than the angle subtended by a bottom of the object 18 in the same x-z plane. Similarly, an angle subtended by a front of the object 18 is larger than an angle subtended by a back of the object 18 in the same x-y plane.

The forgoing discussion describes an ideal camera arrangement. Variations are possible without destroying the intended 3D effect or causing eyestrain. For example, as a matter of convenience and sometimes necessity due to limitations in camera design, multiple cameras can be pointed inward so that their lines of sight (i.e., optical axes) intersect at the center of the scene. This arrangement can produce a certain amount of distortion in the 3D image, but as long as the inward pointing angles are small, the distortion is not particularly noticeable to the casual observer.

Figure 5:
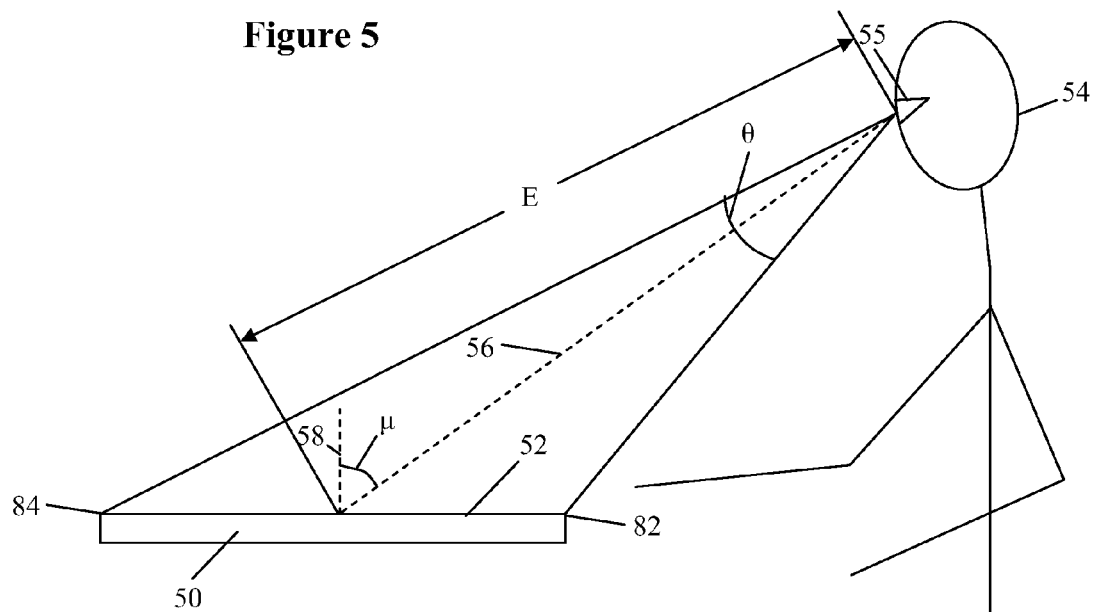
FIG. 5 is a schematic side view of a display arrangement for viewing the offset images of the scene from an off-axis viewing perspective.
Figure 6:
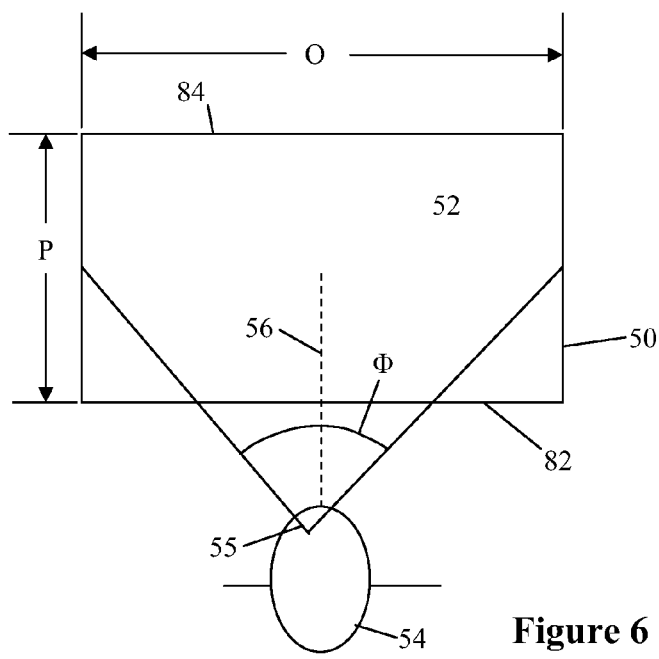
FIG. 6 is a schematic top view of the display arrangement taken normal to a surface of the display.

The display 50 from which the offset images 12 and 14 can be presented is preferably rectangular in shape and is preferably oriented with its display surface 52 (i.e., its image reproducing surface) in a horizontal or near horizontal plane, as shown in FIGS. 5 and 6. The display is ideally oriented in "portrait mode" relative to the observer, with one of the short sides facing the observer, since this orientation will maximize the height to which images seem to extend upward from the display before being cut off by the far edge of the display. However, the "landscape" orientation shown in FIG. 6, can also be used. The display 50 is designed for viewing from an off-axis perspective by an observer 54 along a line of sight 56 similar in angular orientation to the lines of sight 26 and 28 at which the offset images 12 and 14 are captured.

The display 50 can take a variety of forms. For example, an autostereoscopic electronic display such as a LCD (liquid crystal diode) screen can be arranged with parallax optics for producing images that appear to have depth. A conventional display such as a CRT (cathode ray tube) can be arranged to produce polarized images intended for viewing with polarized 3D glasses. An autostereoscopic projection system can be arranged for projecting multiple perspective views of a scene from one or more projectors onto one or more lenticular lens sheets, fly's eye lens sheets, or other suitable light directing screens in a rear projection or front projection arrangement. A projection system can also be arranged for viewing with 3D glasses that projects left and right eye views of images encoded with differing colors or polarization conditions onto a reflective or translucent surface such as a conventional movie screen. A print medium such as a still 3D print can be arranged in connection with a lenticular lens sheet, or a printed sheet of material containing left and right eye views of a stereo image pair can be coded with color or polarization for viewing with 3D glasses.

One type of autostereoscopic display that is particularly well suited for use with this invention uses an LCD (liquid crystal diode) or other transmissive image forming device with a backlight system including of light emitting lines, points, or other shapes placed in certain spatial relationships to the pixels of the display, such as described in U.S. Pat. Nos. 4,717,949, 4,829,365, 5,036,385, 5,349,379, 5,311,220, 5,349,379, 5,410,345, 5,897,184, 6,533,420, 6,157,424, and 6,590,605, which are hereby incorporated by reference. The steady or blinking light emitting regions described in these patents can be formed by such means as structures that generate their own light, transparent areas that allow light from a separate backlight pass through an opaque medium, or areas of light projected onto a surface from a remote light generating device. Variations of this type of display can generate images in which the full resolution of the display is visible to each eye, through the use of different sets of blinking light lines. Such displays can also switch from a 3D display to a 2D display by means of changing the light pattern illumination to even illumination without lines, such as by turning off a separate LCD panel that displays opaque lines with transparent slits between light lines when on but is transparent all the way across its surface when off. Yet another type of autostereoscopic display that can be used with this invention, such as described in U.S. Pat. No. 6,590,605 to Eichenlaub, employs strips of polarizing material with non polarizing gaps in between that can be placed in front of almost any type of flat panel display or behind a transmissive display.

In order to produce a realistic scene for off axis viewing, it is preferred to reproduce, at the observer's eyes 55, patterns of rays similar to those that impinge on the cameras 22 and 24 from a common area of the scene 16 that occupies the same section of the field of view as the display 50 does to the observer 54. This can be accomplished by displaying on the display 50 a section of the scene 16 that occupies the same section of the field of view as the display 50 does to the observer 54.

To the observer 54, the display 50 appears to have a vertical range within the observer's field of view through angle "θ", as shown in FIG. 5, and a horizontal range within the observer's field of view through angle "Φ", as shown in FIG. 6. For reproducing the desired ray pattern in the observer's visual field of view, a rectangular area 60 of the base plane 20 can be defined within the field of view 38 of the cameras 22 and 24 so that the position of the rectangular area 60 relative to the cameras 22 and 24 corresponds to the position of the display 50 relative to the observer 54 and is properly scaled relative to the camera and observer distances. The rectangular area 60 is preferably centered on the row of cameras 22 and 24, such as on a line that is halfway between the two central camera's lines of sight 26 and 28. A width "X" and a height "Y" of the rectangular area 60 can be scaled to a width "O" (side-to-side dimension relative the observer) and a height "P" of the display's image area by a ratio of a distance "D" along the lines of sight 26 or 28 between entrance apertures 62 and 64 of the cameras 22 and 24 and the base plane 20 divided by a distance "E" between the display surface 52 and a midpoint between the pupils of the observer 54.

The "X" and "Y" dimensions of the rectangular area 60 can be scaled to the "O" and "P" dimensions of the display surface 52 as follows:

$$X = O\frac{D}{E}$$

$$Y = P\frac{D}{E}$$

The projection of the rectangular area 60 onto the rectangular areas 34 and 36 of the cameras' image planes is a trapezoid 68, with a shorter side 72 corresponding to a far side 76 of the rectangular area 60, and a longer side 74 corresponding to the near side 78 of the rectangular area 60. This occurs because the image of the far side 76 subtends a smaller horizontal angle than the image of the near side 78.

For producing realistic images visible from off-axis perspectives, image information from the trapezoidal area 68 is presented by the display 50 in such a way that the longer side 74 of the trapezoidal area 68, which is the image of the near side 78 of the rectangular area 60, occupies a fixed length along a bottom edge 82 of the display 50 and the shorter side 72 of the trapezoidal area 68, which is the image of the far side 76 of the rectangular area 60, is stretched to occupy the same fixed length along the top edge 84 of the display 50. That is, the image represented by the trapezoidal area 68 must be stretched so that the shorter side 72 is displayed at the same length as the longer side 74. As a result, the trapezoidal image area 68 is stretched back into the rectangular form so that dimensions of the base plane 20 appear true length.

A general mathematical formula that describes where a given coordinate "X, Y" within the rectangular areas 34 and 36 of the cameras' image planes is converted into coordinates "H, V" of the image areas of the display surface 52 is given below.

$$H = X\frac{E}{F} - \frac{G}{2}$$

$$V = -Y\frac{E}{F}$$

The terms employed in these and succeeding equations are listed in the table below.

| Term | Definition |
|---|---|
| θ | Vertical field of view of the display as seen by the observer |
| Φ | Horizontal field of view of the display as seen by the observer |
| ρ | Angle made between the camera's line of sight and a normal to the base plane |
| H | Horizontal coordinate of a point on the display's image area, relative to a center of the display's image area having a coordinate 0, 0 |
| V | Vertical coordinate of a point on the display's image area, relative to the center of the display's image area having a coordinate 0, 0 |
| O | Width of the display's image area |
| P | Height of the display's image area |
| Q | Display resolution in the O direction |
| R | Display resolution in the P direction |
| S | Display pixel row from center |
| T | Display pixel column from center |
| D | Distance from an eye point of the camera to the base plane along the camera's line of sight |
| F | Focal length from the camera's eye point to the camera's image plane |
| U | Height of the camera's eye point above the base plane |
| G | Horizontal displacement of the two cameras relative to one another |
| E | Ideal distance from which the observer views the display, as defined by a line of sight extending from a point halfway between the observer's pupils to a center of the display' image area |
| X | Horizontal coordinate of a point on the image plane of the camera, relative to a center of the image having a coordinate 0, 0 |
| Y | Vertical coordinate of a point on the image plane of the camera, relative to the center of the image having a coordinate 0, 0 |
| I | Width of camera detector area |
| J | Height of camera detector area |
| K | Camera resolution in the I direction |
| L | Camera resolution in the J direction |
| N | Camera pixel row from center |
| M | Camera pixel column from center |
| W | The amount of stretching required to equate image dimensions among horizontal rows of display pixels. |

The coordinates H and V can be given in standard units such as millimeters or inches. Display devices generally have given horizontal and vertical dimensions along with a given resolution. Similarly, camera detectors generally have a given size and resolution. Conversions into display and camera resolutions can be made simply by converting coordinates into pixel widths and heights.

For example, camera detector areas, such as the rectangular areas 34 and 36, can be understood to have some width I and some height J, along with a resolution of K in the I direction and a resolution L in the J direction. Each pixel will thus have dimensions I/K by J/L. The coordinates of a detected image point can be expressed as the pixel that the image points occupy (e.g., pixel M, N, meaning the pixel in the N row up or down from a central pixel and M column right or left of a central pixel), which can represent an absolute distance X=MI/K and Y=NJ/L.

The display image area generally has a given width O and a given height P, along with a resolution of Q in the O direction and R in the P direction. Each pixel will thus have dimensions O/Q by P/R. The coordinates of a detected image point can be expressed as the pixel that the image points occupy (e.g., pixel S, T, meaning the pixel in the T row up or down from a central pixel and S column right or left of a central pixel), which represents an absolute distance H=SO/Q and V=TP/R.

By replacing the camera and display coordinates X, Y and H, V in the general formulas with the above pixel expressions, the image point positions can be expressed in terms of pixel location in both the camera and the display as follows:

$$\frac{SO}{Q} = \frac{MI}{K}\frac{E}{F} - \frac{G}{2}$$

$$\frac{TP}{R} = -\frac{NJ}{L}\frac{E}{F}$$

Here G is also expressed in pixel coordinates. By a further rearrangement the display pixel coordinates S, T can be written in terms of the camera pixel coordinates as follows:

$$S = \frac{Q}{O}\left(\frac{MI}{K}\frac{E}{F} - \frac{G}{2}\right)$$

$$T = -\frac{R}{P}\left(\frac{NJ}{L}\frac{E}{F}\right)$$

The preferred distortion of the offset images 12 and 14 assumes that the off-axis lines of sight 26 and 28 of the cameras 22 and 24 are inclined to the normal 30 of the base plane 20 through the same angle that the intended line of sight 56 of the observer 54 is inclined to the normal 58 of the display surface 52. The imaginary rectangular area 60 on the base plane 20 has the same aspect ratio as the display 50, but is projected onto the image planes of the cameras 22 and 24 as the trapezoidal area 68.

For replicating the cameras' perspectives with the display 50 from a corresponding viewing perspective that equates the base plane 20 of the scene 16 to the display surface 52, the trapezoidal area 68 of the cameras' image planes is mapped onto the image-reproducing plane of the display surface 52 in such a way that the trapezoidal area 68 is stretched into a rectangular form matching the dimensions of the rectangular area 60. As a result, the long side 74 of the trapezoidal area 68 is scaled to substantially fill the bottom edge 82 of the display 50 and the short side 72 of the trapezoidal area 68 is scaled to substantially fill the top edge 84 of the display 50. The amount of stretching for any given horizontal row "T" of pixels is a linear function of its position relative to the top and bottom rows of pixels within the display 50. The amount "W" of required stretching, expressed as a number by which the given line's length must be multiplied to produce the final ling length in the distortion-corrected image, is given by the formula:

$$W = \frac{T}{R}\left\{\left[\frac{\cos\left(\rho - \frac{\theta}{2}\right)}{\cos\left(\rho + \frac{\theta}{2}\right)}\right] - 1\right\} + 1$$

This type of image manipulation can be accomplished automatically or it can be done by hand using computer programs such as Photoshop. Optically, the preferred distortion corresponds to a substantially vertical keystone distortion in which the near to far reaches of the offset images 12 and 14 are progressively magnified to compensate for the apparent magnification reductions with distance associated with viewing the display surface 52 from an inclined perspective. The magnification adjustment can be made optically within or in advance of the camera so that the required keystone distortion is incorporated into the offset images 12 and 14 formed on the camera image planes. With this optical distortion, rectangular forms on the base plane 20 can be imaged as the same rectangular forms in the cameras 22 and 24.

Although the forgoing description involves the use of cameras 22 and 24 that are looking down at a scene 16 from an off-axis angle "ρ", and a nearly horizontal display surface 52 that is observed from above at a similar off-axis angle "μ", the same principles and formulas apply for any off-axis camera/scene and display/observer arrangement. The formulas and forgoing discussion describe, in general, a situation where the cameras 22 and 24 are recording a scene 16 that exists mostly above or below a defined base plane 20 that is situated at an angle to the optical axis (i.e., line of sight 26 or 28) of the cameras 22 or 24, and the recorded images 12 and 14 are intended to be displayed to an observer 54 looking at the display surface 52 from a similar off-axis angle, in such a way that the base plane 20 in the scene 16 appears to be parallel to the display surface 52. For example, the base plane 20 of the scene 16 could be vertical or at some other orientation as long as the cameras 22 and 24 are oriented at an off-axis angle (e.g., "ρ") relative to it. Similarly, the display surface 52 could be vertical or at some other orientation as long as the viewing setup is designed so that the observer 54 looks at the display 50 from an off-axis angle (e.g., "μ") relative to the display surface 52. For example, the display 50 could be mounted high on a wall to display a wall hanging or a hunter's animal head trophy that seems to stick out of the wall, and the observer would view it from below at an angle.

Figure 7:
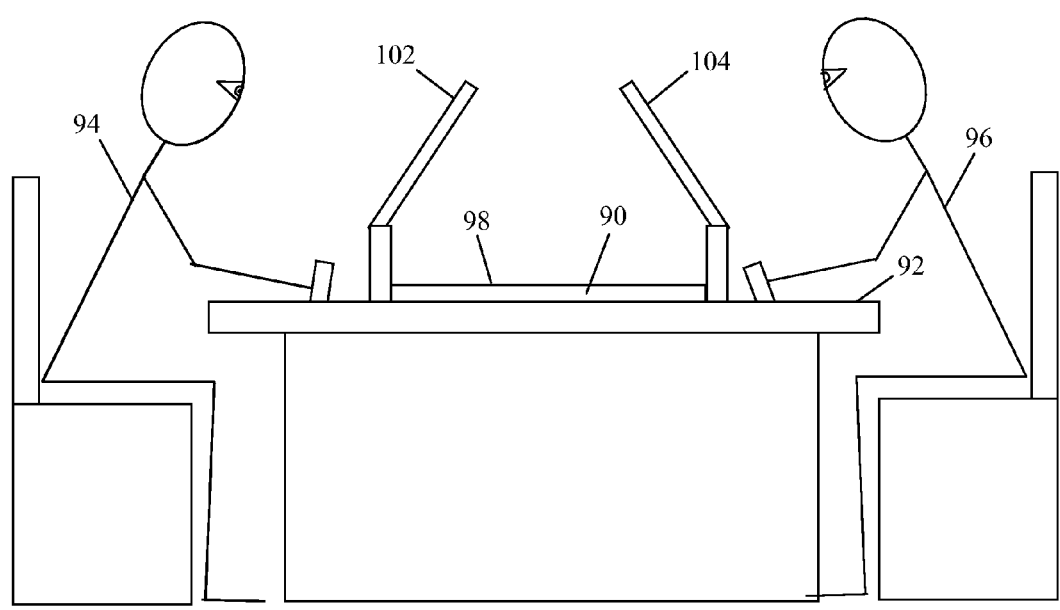
FIG. 7 is a schematic side view of a display arrangement for a computer game arranged for viewing from different off-axis viewing perspectives by two players seated on opposite sides of the display.

Another use for a 3D display with a vertical projection is for computer gaming. A preferred arrangement for a two-player game is shown in FIG. 7. An autostereoscopic display 90 lies horizontally on a table 92 or like surface. Ideally the display it would be oriented for projection in a portrait mode relative to two game players 94 and 96 seated on opposite sides of the table 92. As so oriented, the display 90 creates parallax viewing zones along a plane parallel to a display surface 98 at about the same height above it as a typical player's eyes when the player is seated. Such viewing zones and how they are created, their geometrical arrangement relative to a display, and the manner in which they are used to create images that appear to have depth are well known to the art and are described in U.S. Pat. No. 4,717,949, which is incorporated herein by reference, among many other places. The viewing zones extend out to the viewing positions of each player 94 and 96, who would typically be looking at the display surface 98 from about 45 degrees off center.

Shutters 102 and 104 are placed between each player 94 and 96 and the display 90. These shutters 102 and 104 are preferably electronically controlled, such as liquid crystal panels, that can alternately transmit or block light by changing the polarization direction of light passing through them between two orthogonal angles. If the display 90 is also a liquid crystal display, then the liquid crystal shutters 102 and 104 could have polarizers on the sides facing the display 90 that have a polarization direction parallel to that of the front polarizer of the display 90. The shutters 102 and 104 could also have polarizers on the side facing the players 94 or 96, typically with their polarization direction oriented at 90 degrees to the front polarizers. Each shutter 102 and 104 is large enough so that each player 94 or 96, when positioned comfortably on either side of the table 92, can see the entire display 90 though the shutter 102 or 104 in front of them.

Each shutter 102 and 104 alternately lets light pass through and blocks light. The two shutters 102 and 104 can work out of phase with one another so that when one player 94 is seeing light from the display 90, the view of the other player 96 is blocked, and vice versa. The shutters 102 and 104 preferably operate at a speed of at least 1/30th second for each on/off cycle, and preferably faster, to avoid excessive flicker.

Before each shutter 102 or 104 opens, the display 90 forms images appropriate for viewing by the player 94 or 96 whose shutter 102 or 104 is about to become transparent. Each player 94 and 96 sees a different view of a scene. The view is preferably a stereo perspective view from that player's position of some characters, vehicles, or game pieces moving across or through the display surface 98.

Figure 8:
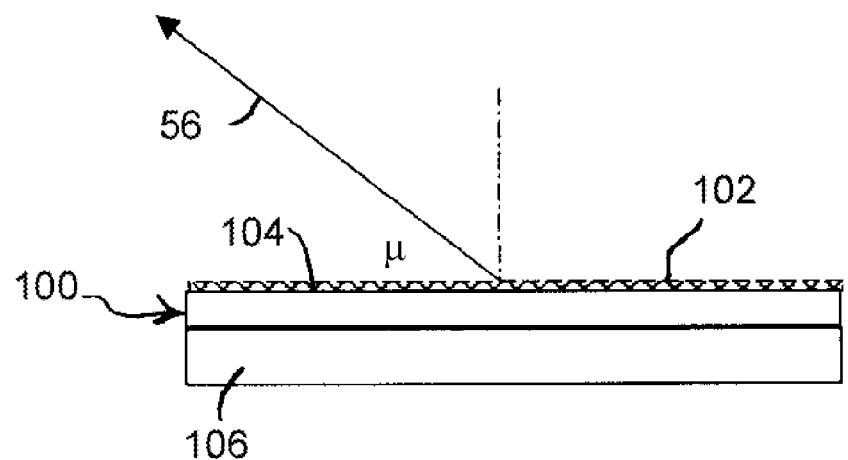
FIG. 8 is a schematic side view of the display showing a light-redirecting feature.

Conventional displays, particularly LCD displays, direct most of their light in a direction near the normal to the display, since this is the direction from which the display is usually viewed. Such conventional displays can be modified for purposes of the invention, as shown by the display 100 of FIG. 8, for viewing at off-axis angles, such as viewing angles "μ" of 45 degrees from the normal, by mounting a layer of light-directing film 102, such as 3M light directing film, either on a front surface 104 of the display 100 or within a backlight 106 to direct more of the light emitted from the display 100 in the intended off-axis direction of view. The light-directing film 102 can include thin layer of flexible plastic with hundreds small parallel sawtooth prism ridges formed into one side.

Figure 9:
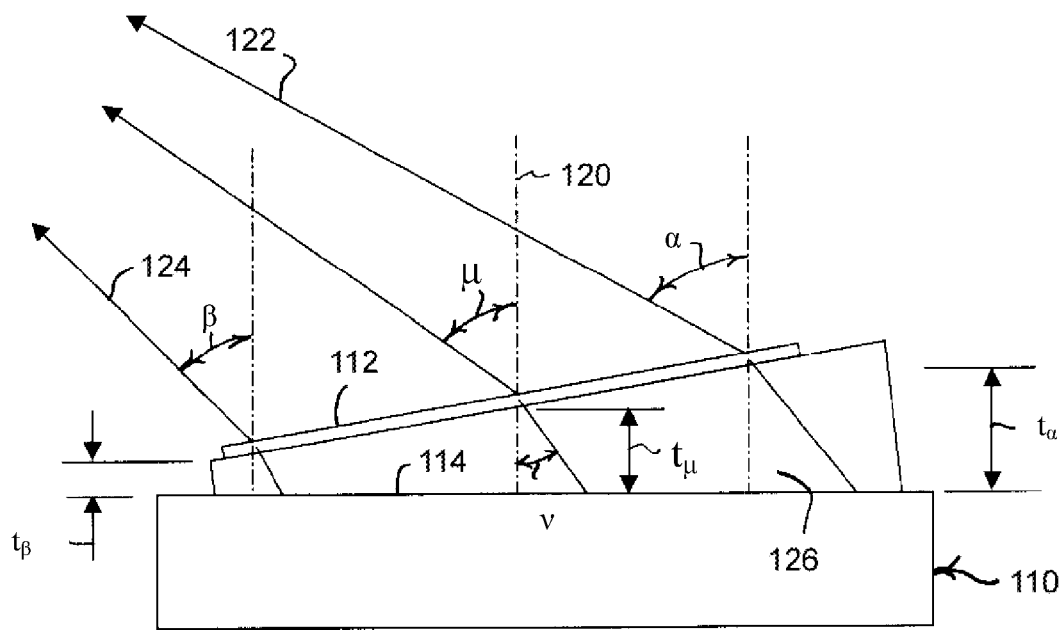
FIG. 9 is a schematic side view of a parallax display that is distorted to emphasizing angular and thickness relationships between an image separator and an image-reproducing plane.

The preferred displays for parallax projections, such as the display 110 of FIG. 9 include an image separator 112 for directing the offset images 12 and 14 to different alternating spatial positions so that each of an observer's eyes sees a different one of the offset images 12 or 14. The image separator 112 is preferably an optical assembly that creates lines of light that are parallel to each other and to the pixel columns of the display 110. The image separator 112 could also be formed as a barrier with parallel slits or slit segments placed in front of the display 110, either parallel to the pixel columns (as in displays made by 3D Experience Ltd.) or at an angle to the pixel columns (as in displays made by X3D Corporation).

The image separator 112 is located at a prescribed spacing from an image-reproducing plane 114 of the display 110 to direct light from one set of pixels on the display surface to one eye and the other set of pixels to the other eye. For creating conventional 3D viewing zones that are optimum for a person seated at a certain distance "$D_O$" along a normal or near the normal to the display, the image separator must be placed at a distance "t" from the image plane occupied by the pixels as given by the following relationship:

$$t = np\frac{D_O}{E_Z}$$

where "n" is an index of the separation space (which is generally glass), "p" is the pixel pitch (or pixel sub-element pitch for typical vertical color stripe displays), and "$E_Z$" is the desired viewing zone width (which is generally equal to an average separation between pairs of adult human eyes or approximately 63 mm).

However, for viewing a display through the off-axis angle "μ" to the normal 120, the preferred viewing distance "$D_μ$" can be specified as a distance along the line of sight 56 between the observer's eyes 55 and a center of the display. In order to make the viewing zones of the display the proper width at this distance "$D_μ$" along the viewing line 56, the image separator 112 is preferably mounted at a different separation distance "$t_μ$". For exiting the image separator at the desired viewing angle "μ", light propagates through the spacing between the image-reproducing plane 114 and the image separator 112 at an angle "v", which is equal to asin(sin(μ)/n). The distance "$t_μ$" along the normal between the image separator and the pixels is equal to the following expression:

$$t_\mu = np\frac{D_\theta}{E_Z}\cos v$$

By substitution, the above equality can be rewritten as:

$$t_\mu = np\frac{D_\theta}{E_Z}\cos\left[\sin^{-1}\left(\frac{\sin\mu}{n}\right)\right]$$

The image separator can be oriented with its face parallel to the pixel image plane, with all points on its surface at the distance "$t_μ$" defined above. However a further improvement in its orientation is possible. With respect to the line of sight through the distance "$D_μ$" to the center of the display, which is inclined through the angle "μ", a line of sight 122 to the top (i.e., far side) of the display 110 is inclined a larger angle "α" from the normal, and a line of sight 124 to the bottom (i.e., near side) of the display is inclined at a smaller angle "β" from the normal. Therefore, an ideal spacing distance "$t_α$" for the side of the image separator 112 farthest from the observer and the ideal spacing distance "$t_β$" for the side of the image separator 112 closest to the observer are given as follows:

$$t_\alpha = np\frac{D_\alpha}{E_Z}\cos\left[\sin^{-1}\left(\frac{\sin\alpha}{n}\right)\right]$$

$$t_\beta = np\frac{D_\beta}{E_Z}\cos\left[\sin^{-1}\left(\frac{\sin\beta}{n}\right)\right]$$

A plot of the ideal separation distances "t" for each point along the center of the image separator, from the farthest side to the nearest side, traces a curve along which "t" is smaller at the near side and becomes progressively larger as it approaches the far side of the display. The exact shape of this curve depends on the angles "α" and "β", the index "n", and the viewing distance "D", but each point on the curve will be at a distance "$t_η$" from the pixel layer defined by the following expression:

$$t_\eta = np\frac{D_\eta}{E_Z}\cos\left[\sin^{-1}\left(\frac{\sin\eta}{n}\right)\right]$$

where "η" is the variable angle at which a point on the curve is seen by an eye at the central eye point.

In practice, it is difficult to make an image separator 112 whose surface is curved. A more practical solution is to tilt a flat image separator 112 as shown in FIG. 9 so that it's center is at distance "$t_μ$" and its far side is as close as possible to distance "$t_α$" and its close side is as close as possible to distance "$t_β$" from the image-reproducing plane 114. This tilting can be accomplished by using a transparent wedge-shaped glass 126 or plastic spacer between the image separator and the display device. A similar effect could be accomplished without tilting the image separator 112 relative to the image-reproducing plane 114 if the glass spacer 126 were modified with parallel surfaces and an index gradient from top to bottom. If the index changed in the correct manner from top to bottom of this spacer, the distances between the image separator 112 and the image-reproducing plane 114 could be made to match the required distances "$t_\alpha$", "$t_\mu$", and "$t_\beta$" at the top, center, and bottom of the display 110.

The image separator can also be a lenticular lens whose lens elements are parallel to the pixel columns of a display or to image strips in a still photograph, or whose elements are skewed relative to the pixel columns, as they are in displays made by StereoGraphics Corporation and Phillips. The image separator can also be a fly's eye lens designed to produce parallax in two directions, as is well known to the art. The amount of tilt required for such a lens relative to the image plane depends not only on the pitch of the lens and pixels, and the distance between the lenses and pixels, but also on the focal lengths of the lenses, which can vary with angle, and on field curvature. In general, the image surface (the photographic image or the pixels in an electronic display, must be positioned at such a distance from the lens surfaces that their light is collimated upon exiting the lens. In the case of simple, single surface lenses, this requirement generally forces the image surface to be positioned closer to the lens surfaces for off axis viewing, not farther. Therefore, in a display using microlens arrays, the far side of the array should in most cases be closer to the pixels of the display than the near side. As in the case described above, the lenses could be mounted on the outside surface of a flat-sided wedge-shaped spacer that varies in thickness linearly from top to bottom, or on the surface of a sheet of gradient index material.

Figure 13:
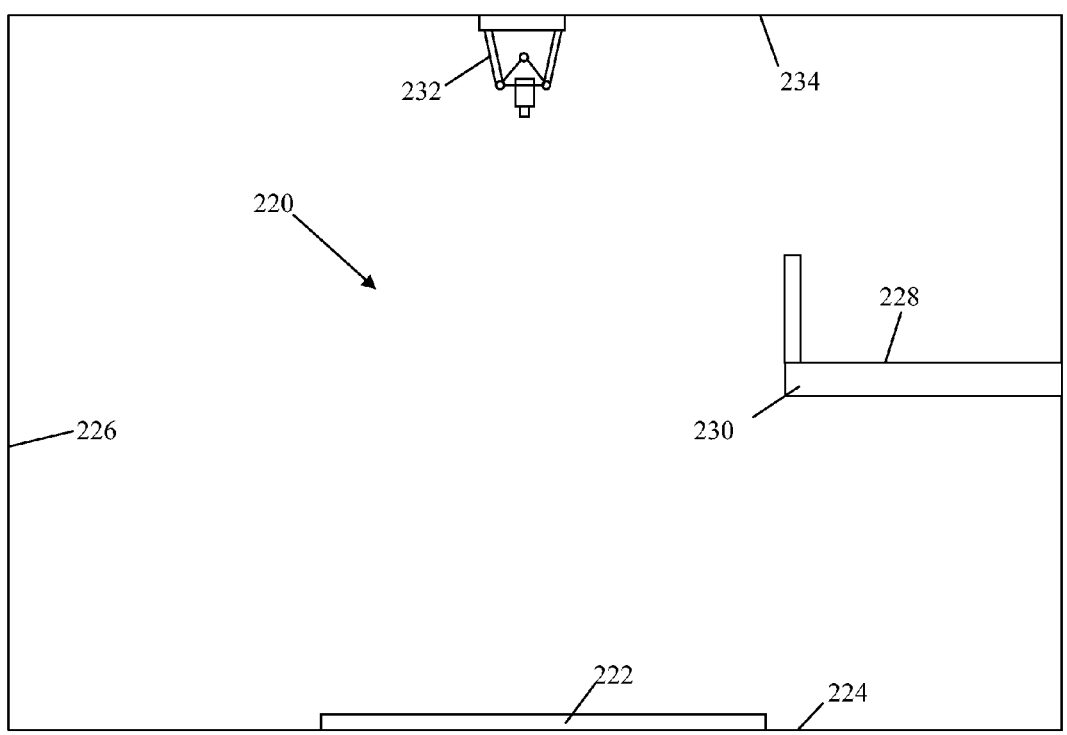
FIG. 13 is an upright view of a projection system having a perspective overlooking a floor on which a projection screen is mounted.

A similar design would be ideal for some large projection displays, such as the floor-mounted display 222 shown in FIG. 13. In this display, the lenticular lens sheet could be tilted or bent so that the edge farthest from the point of view of a raised area 230 is closer to the reflective surface behind the lens.

Since it is difficult to produce a wedge-shaped or gradient-index spacer between the image separator and the pixels, an alternative, albeit less preferred, configuration has been devised. In this configuration, the image separator is kept parallel to the pixel plane, with the separation distance "$t_\mu$" being constant all the way across the display. However, the x-axis (i.e. side-to-side) spacing between the image separating structures is varied from the closest side to the farthest side of the display. For example, if the image separator contains light emitting lines situated behind the pixels of an LCD (liquid crystal display as described in U.S. Pat. No. 4,717,949, the pitch (center to center distance) of the lines would be less at the top of the display than at the bottom of the display. In other words, the lines would be slightly angled inward in a "V" pattern. The pitch of the lines at the center of the display would typically be given by the formula $L=2/(1/p-1/e)$ where "p" is the pitch of the pixels and "e" is the average separation of a pair of observer's eyes (about 63 mm for adult humans). The pixel-to-line spacing does not enter into this equation. The pitch "L" of the lines at any given distance above or below the center would be given by the formula $L_n=2/(1/p-1[\{t_\mu/t_n\}e)])$. Where "$t_\mu$" and "$t_n$" are given by the formulas above. This would result in lines that are slightly curved. Since it would be easier to use straight lines, the lines could simply start with a pitch equal to $L_\beta=2/(1/p-1/[\{t_\mu/t_\beta\}e])$ at the close side and widen to a pitch $L_\alpha=2/(1/p-1/[\{t_\mu/t_\alpha\}e])$ at the far side. Although the formulas used for spacer thickness are re-used here, they are being used only to calculate the relative line pitch. The spacer thickness in this case is assumed to be constant across the extent of the display.

Other types of image separators can rely on similar variation in x-axis pitch between the separating elements. For example, if slit barriers or lenticular lenses are used as image separators in front of the display, the pitch formulas would be almost identical to those given in the last paragraph, the only difference being that a positive sign would be used in the denominator instead of the negative sign used above. If fly's eye lenses or arrays of light emitting dots were used (the latter described in U.S. Pat. No. 4,829,365) then the pitch between the adjacent vertical columns of separators would vary according to the above formulas.

Figure 10:
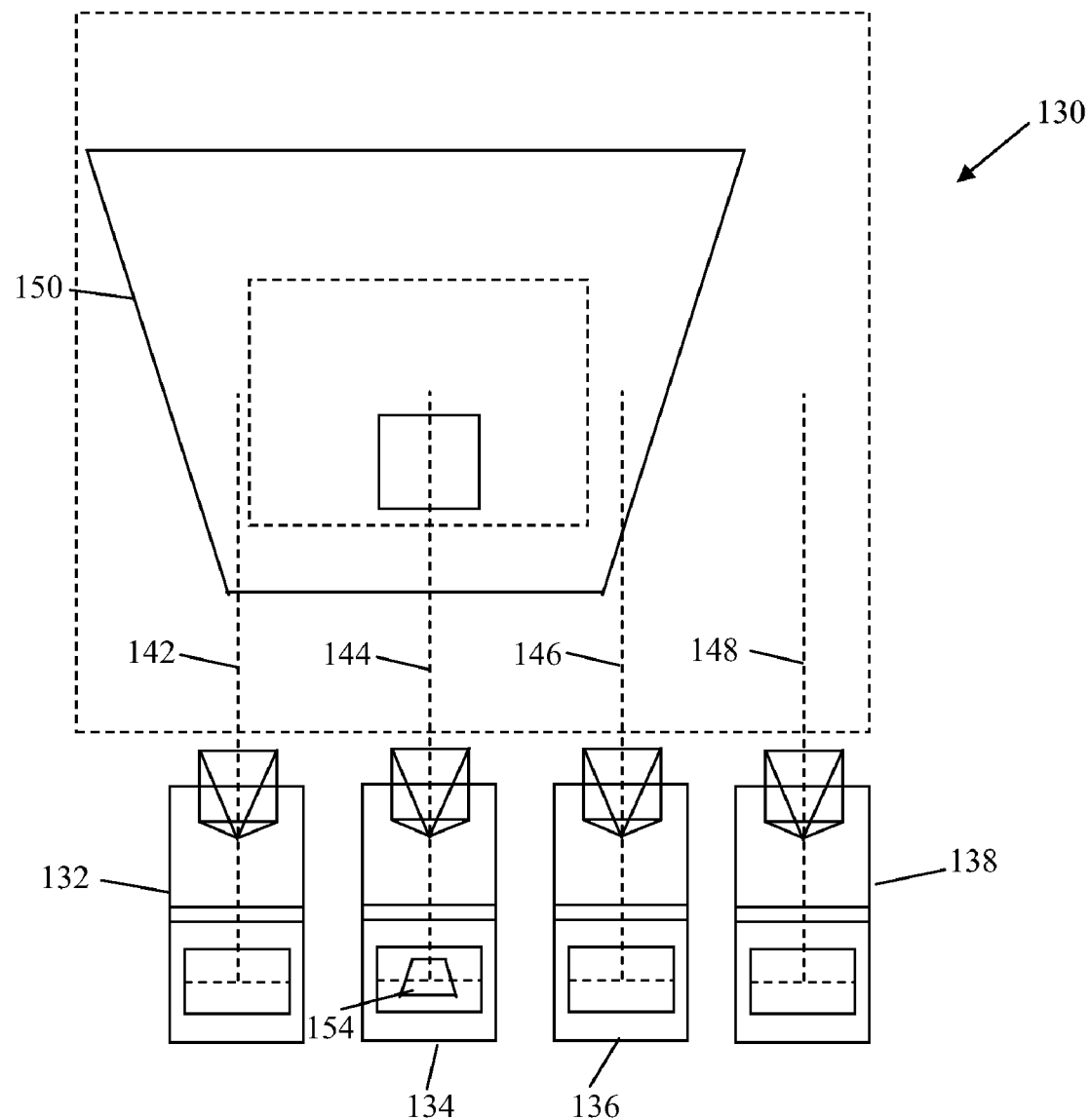
FIG. 10 is a schematic top view of a camera arrangement showing four cameras arranged in a row.

The remaining drawing figures illustrate alternative camera or display configurations intended for the practice of the invention. For example, FIG. 10 depicts a camera arrangement 130 including a bank of cameras 132, 134, 136, and 138 with parallel optical axes 142, 144, 146, and 148 for viewing overlapping portions of a scene 150. Images from each of the cameras 132, 134, 136, and 138 such as the image 154 of the camera 134 are distorted to accommodate intended off-axis views of the images from a display (such as any one of the displays herein) at least approximately matching the off-axis views taken by the cameras 132, 134, 136, and 138.

Figure 11:
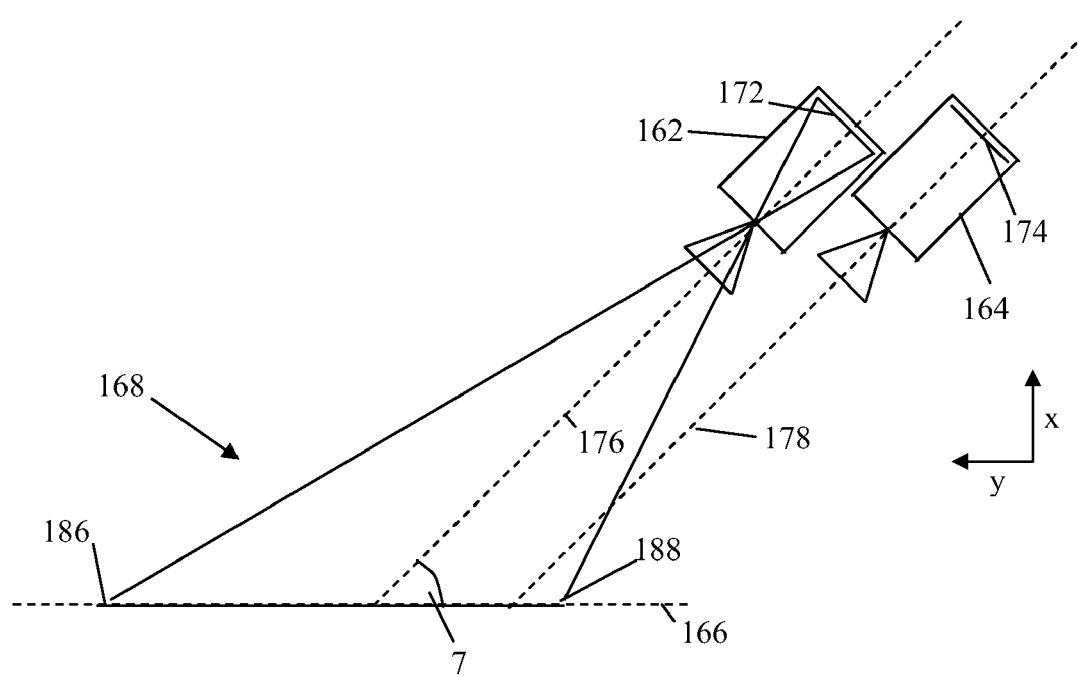
FIG. 11 is a schematic side view of a camera arrangement with cameras having optical axes extending in planes parallel to the plane of the paper.
Figure 12:
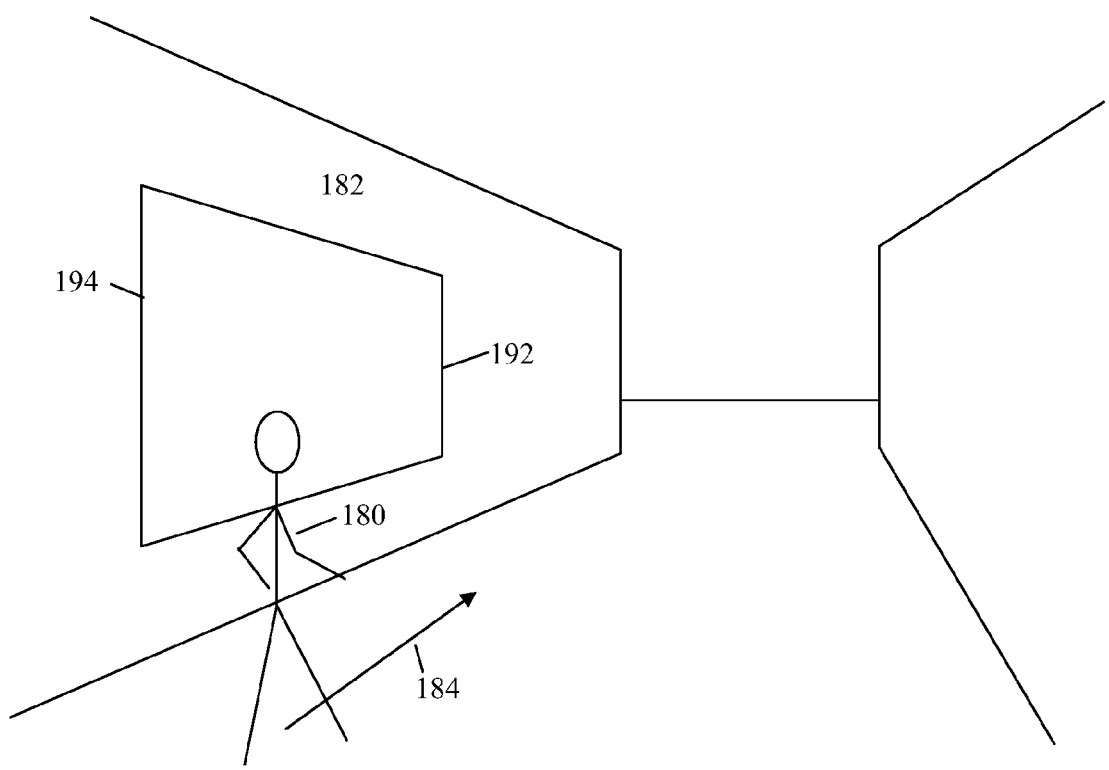
FIG. 12 is a schematic view of a vertical display arranged for off-axis viewing of a scene from the camera angles of FIG. 11.

FIGS. 11 and 12 depict an alternative camera perspective and a corresponding alternative viewing perspective. Two cameras 162 and 164 are shown in FIG. 11 offset from each other in a common plane normal to a base plane 166 of the scene 168. This situation is intended for viewing in an off-axis direction to the side of the captured images 172 and 174. An example of this type of situation is illustrated in FIG. 12, where an observer 180 is shown walking past a more or less vertically mounted display 182 on a path 184 parallel to it. The observer 180 is intended to optimally view the images 172 and 174 reproduced by the display 182 from a perspective matching the perspective of the cameras 162 and 164 to the base plane 166. This type of display arrangement can be used, for example, for displaying 3D images to passersby walking along a sidewalk past a display in a window in a department store. The display 182 creates viewing zones in a plane that is parallel or nearly parallel to its surface.

The cameras 162 and 164, which are intended for taking the images 172 and 174 necessary for viewing the scene 168 at similar off-axis angles of view are preferably mounted along a line that matches the bilateral offset of the observer's eyes. The base plane 166 is matched to the intended plane of the display 182, and the cameras 162 and 164 are oriented to the base plane 168 as the observer's eyes are oriented to the plane of the display 182. The camera axes 176 and 178 preferably remain parallel to one another to avoid parallax distortions.

The compensating distortions performed on the images 172 and 174 obtained from each camera 162 and 164 can be performed similar to the compensating distortions described above, except that now the cameras 162 and 164 and eye points are considered offset in a different direction. Therefore, the trapezoidal image sections of the area of the scene that will show up on the display 182 will have their parallel long and short sides 186 and 188 at the sides of the image area that are farthest (long side) and closest (short side) to the cameras 172 and 174, which are displayed on the right and left sides 192 and 194 of the display 182.

Figure 14:
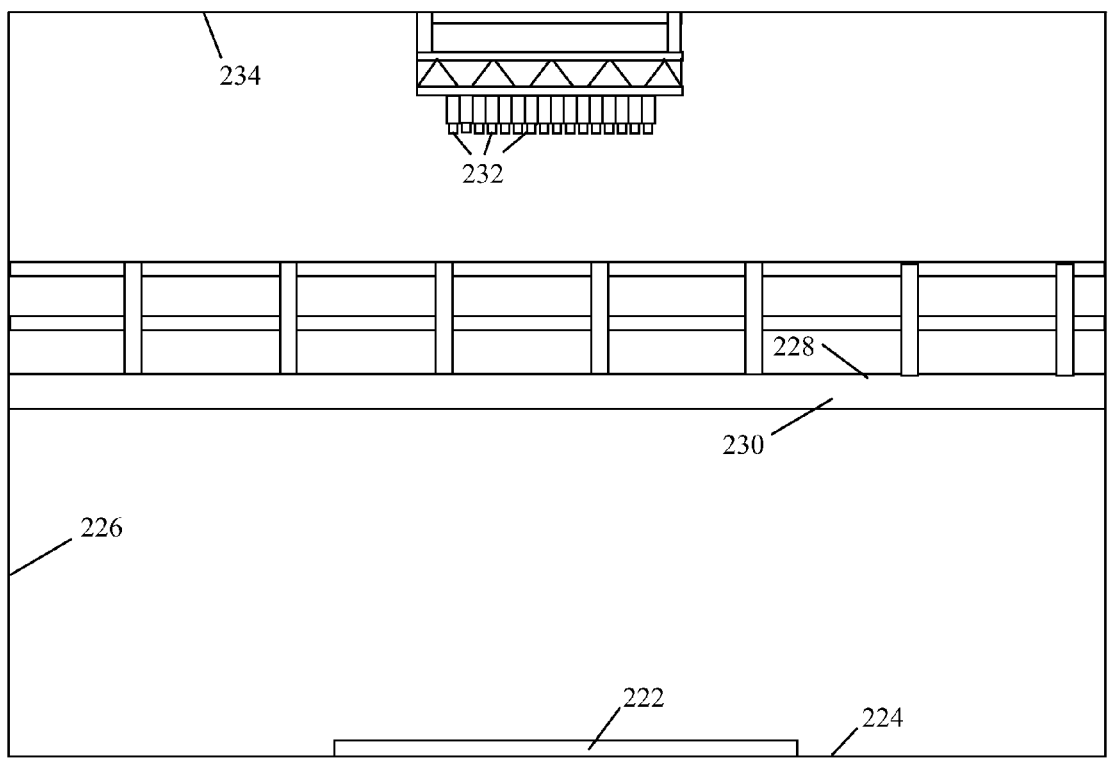
FIG. 14 is an upright side view of the projection system showing a bank of projectors positioned above the floor.

FIGS. 13 and 14 depict a projection system 220 for off-axis viewing of 3D scenes. Prior art teaches that that a large (e.g., several meter by several meter) 3D moving or still image can be placed on the floor 224 of a room or other structure 226, in order to create large and even life size images designed for viewing from off axis perspectives. The display and its images can be designed for viewing by observers standing next to it or by observers standing on the raised area 230 in order to view the display from a steeper viewing angle.

Figure 15:
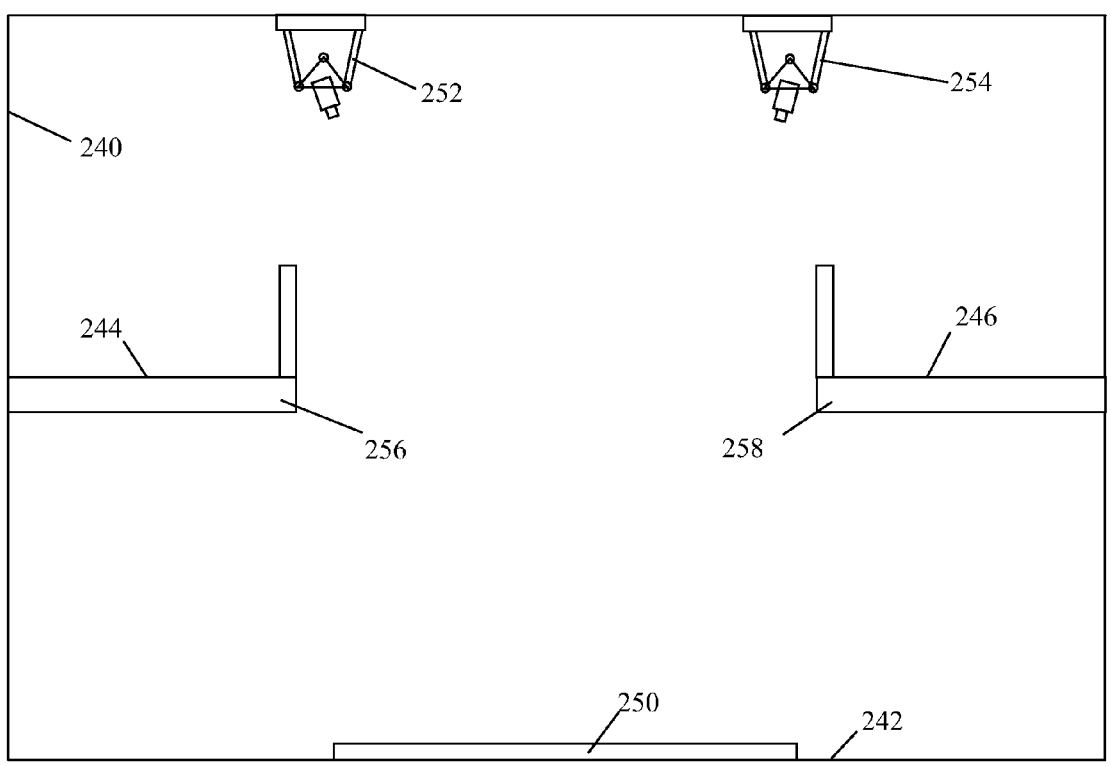
FIG. 15 is an upright view of an alternative projection system in which two banks of projectors project different images that are reflected from a floor-mounted display screen toward two opposing perspectives.

A method of implementing such a large 3D display involves using a reflective lenticular lens screen 222 (or an equivalent screen) placed on or near a floor 224. A bank of projectors 232 is mounted from a ceiling 234 or other elevated part of the structure 226, so that they project perspective views on the screen 222 whose light is directed into viewing zones by the screen. If the screen is designed to be viewed from two sides, as shown in FIG. 15, two rows of projectors 252 and 254 can be used, the row of projectors 252 being offset toward one viewing area 256, the other row of projectors 254 offset toward the other viewing area 258, and both angled or otherwise projecting toward the center of a large display screen 250 so that the light of each row of projectors 252 or 254 is reflected toward the viewing areas 258 or 256 on the opposite side of the display screen 250. Thus, the observers in the viewing area 256 see the images from the projectors 254 that are offset toward the opposite viewing area 258, and the observers in the viewing area 258 see the images from the projectors 252 that are offset toward the opposite viewing area 256. In this embodiment, the backing for the lenticular lens screen should possesses specular reflection properties in the direction parallel to the plane of the page in FIG. 15. Each of the rows of projectors 252 or 254 would project images with the correct perspective for the people in the viewing areas 256 or 258 to which its reflected light is directed. For example, one set of observers in one of the viewing areas 256 could be shown a scene from the "front" and another set of observers in the other viewing area 258 could be shown the scene from the "rear", or the observers in the different viewing areas 256 and 258 could be shown two entirely different scenes. Comparable off-axis 3D images can be formed by locating the viewing screens on ceilings observed from similar off-axis angles of view.

Figure 16:
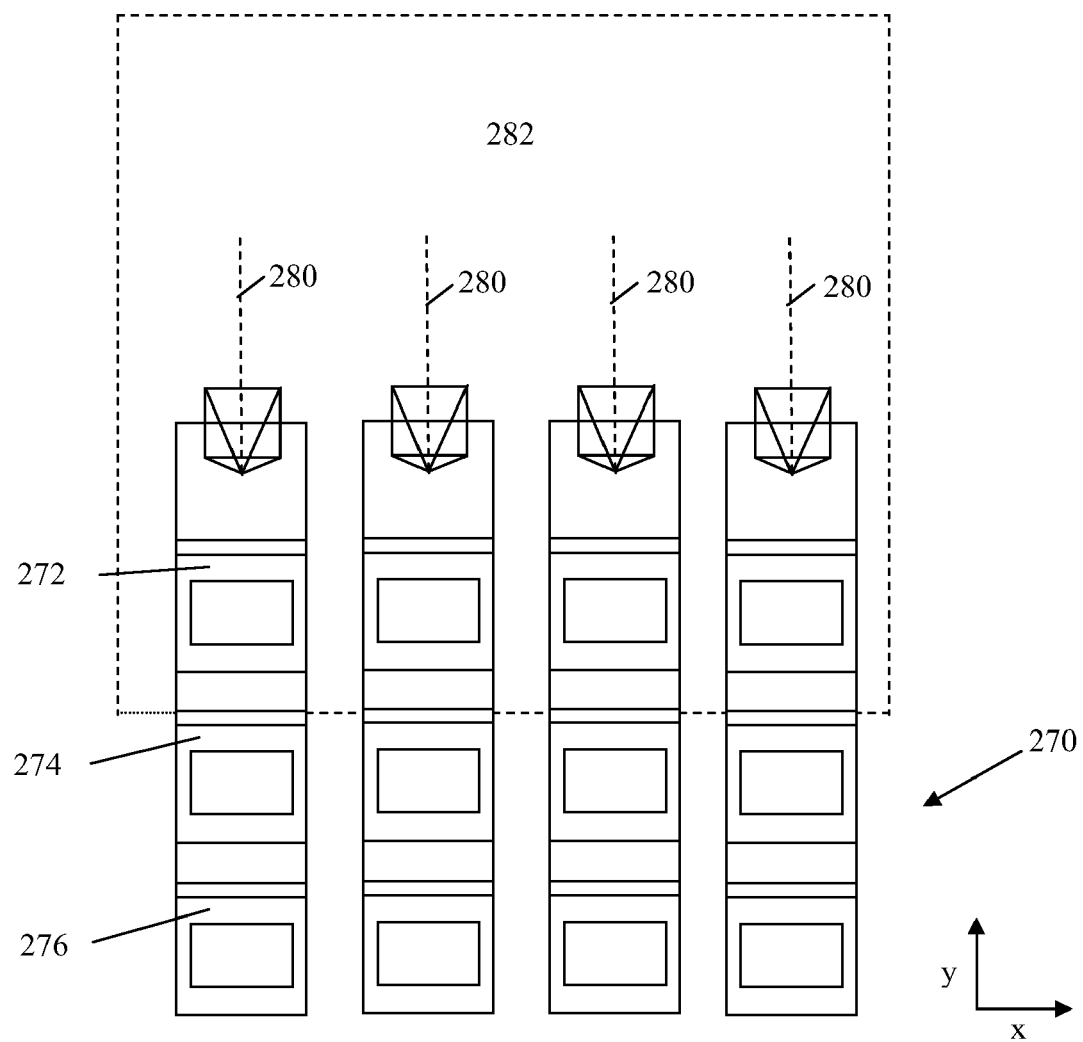
FIG. 16 is a schematic top view of the camera arrangement taken normal to the base plane of the scene showing a bank of cameras arranged in an array of rows and columns.
Figure 17:
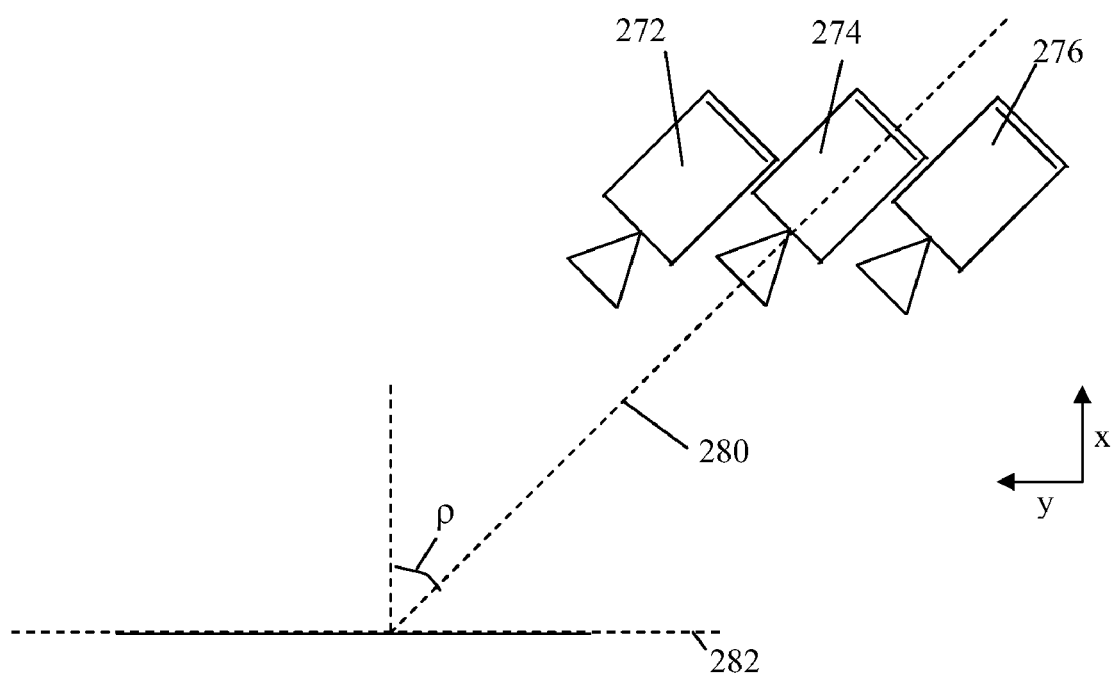
FIG. 17 is a schematic side view of the camera arrangement of FIG. 16 having parallel optical axes inclined to a normal to the base plane.

Some types of autostereoscopic displays produce 3D images that exhibit parallax in two orthogonal directions instead of just one. For a typical desktop or video display, these directions are usually horizontal and vertical. Such 3D displays are well known to the art can be made, for example, by using points of light positioned behind groups of pixels on an LCD, as described in U.S. Pat. No. 4,829,365 to Eichenlaub with reference to FIGS. 16-18, and in U.S. Pat. No. 5,036,385 to Eichenlaub with reference to FIGS. 6 and 7, both of which are incorporated herein by reference. This type of display usually produces square or rectangular viewing zones that are arranged in a grid pattern of columns and rows across an ideal viewing plane spaced apart from the display. Such viewing zones are illustrated in FIG. 17 of U.S. Pat. No. 4,829,365 and in FIG. 7 of U.S. Pat. No. 5,036,385 and are described in the bodies of these patents. It is also possible to create viewing zones that are arranged in a brick like pattern or some other pattern within the intended viewing plane.

Generally, more than one row of cameras is required to capture the multiple images reproduced by such 3D displays that produce rows and columns of viewing zones. FIGS. 16 and 17 depict a camera arrangement 270 that can be used with such 3D displays for off-axis viewing in accordance with this invention. Three rows 272, 274, and 276 of four cameras each are shown, but any number of rows and columns can be used. The cameras can be real still, video, movie, or similar cameras, or virtual cameras or "eye points" existing only in software and used to generate views of virtual computer generated scenes. One of the three rows 272, 274, or 276 can be translated through the positions of the other rows for capturing a similar set of images of a still scene. In fact, a single camera can be indexed through the entire array of camera positions.

The individual cameras are preferably arranged in relative positions that correspond to the positions of the viewing zones created by the 3D display. For example, the camera arrangement 270 as shown in FIG. 16 corresponds to viewing zones that are stacked one over the other in straight rows and columns parallel to the edges of the 3D display. However, if the viewing zones were to be arranged in an offset brick-like pattern, each row 272, 274, or 276 of cameras would be offset sideways relative adjacent rows. The optical axes 280 of the cameras are preferably inclined relative to a base plane 282 of the scene in the same manner that the intended viewing axes are inclined to the display surface. As in previous arrangements each of the cameras is ideally positioned with its optical axis 280 parallel to those of the other cameras, with all the optical axes inclined through off-axis angle "ρ" to a normal of the base plane 282. However, in some limited cases it is possible to aim all the cameras inward toward some common point and still get acceptable results.

The distortion performed on the images captured by each camera is preferably the same as the distortion described above in relation to FIGS. 1 through 4, with each of the individual cameras distance "D" and off-axis angle "ρ" being used within the formulas.

It is possible to create stereoscopic or autostereoscopic 3D images designed for off axis viewing, commonly called "phantograms" without having to perform the corrective distortion of the images that is usually performed. This method can be implemented in many off the shelf animation and rendering programs if the rendering process is set up correctly.

3D rendering programs typically produce images of a scene by tracing rays from points on a bounded virtual plane, analogous to the pixilated sensor plane of a virtual camera, through a virtual point equivalent to the lens or pinhole of a camera. The pinhole is typically called an eye point; the eye point and the virtual plane are typically called a virtual camera. The rays are extended out to the scene to the points where they intersect objects, light sources, or the background. A brightness and color value is calculated based on the reflectance, orientation, and light emission properties at the points that each ray intersects, plus the position and intensity of virtual light sources within the scene. The resulting value is assigned to the point at which the ray started, which in turn is assigned to a pixel of an image.

Figure 18:
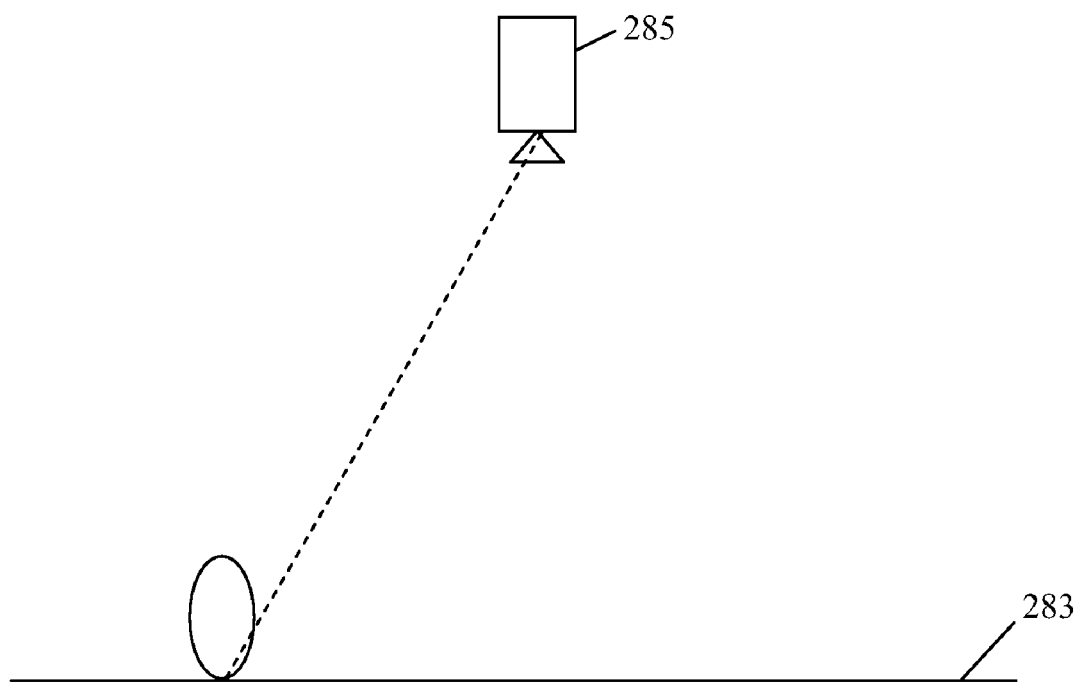
FIG. 18 is a diagram of rendering a scene for off axis viewing
Figure 19:
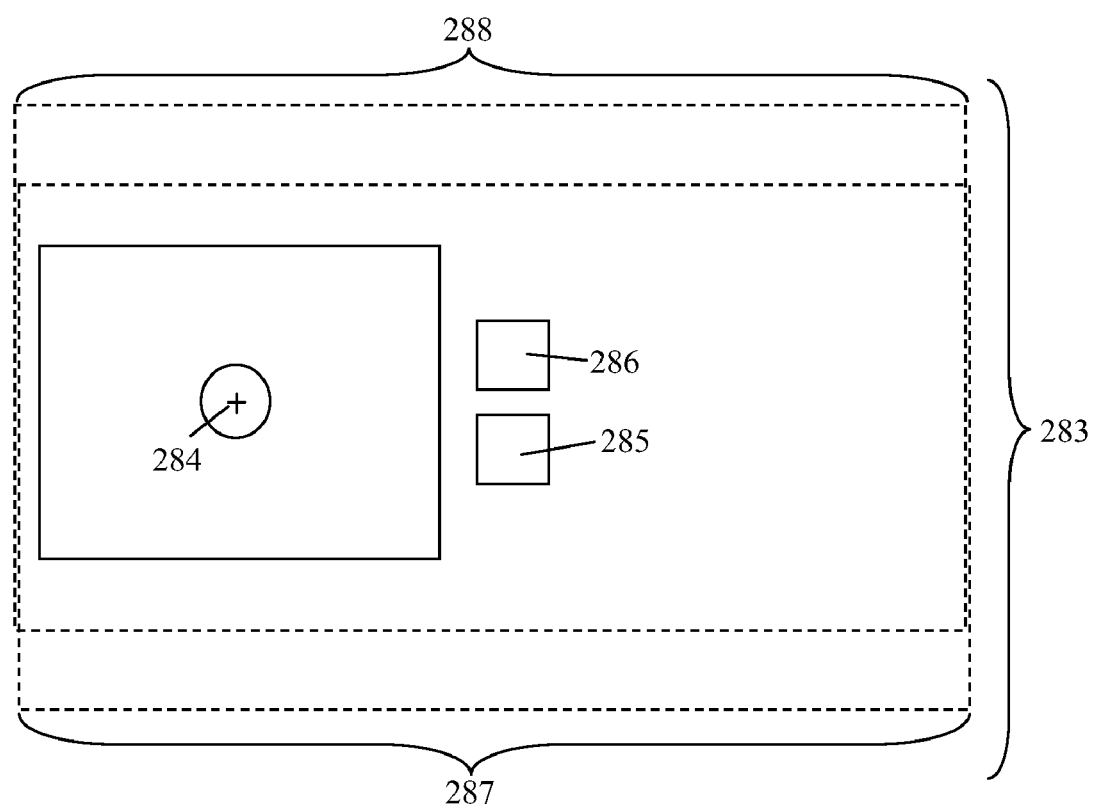
FIG. 19 is a top view of the scene in FIG. 18

In order to render images for off axis viewing, as illustrated in FIG. 18 and FIG. 19 (a top view of the scene in FIG. 18), one starts by placing the virtual cameras 285, 286 with their virtual optical axes oriented in a direction perpendicular to the plane, 282, called a base plane, which will ultimately appear to be on the screen when the scene is displayed. The cameras are placed in a position where the angle between their virtual lenses (typically virtual pinholes) and the center of the scene 284 make angles identical to the typical angles at which the display is intended to be viewed from, that is the angle between the observer's eyes and the center of the screen. Although this example shows two cameras, any number of cameras can theoretically be used, as in the previous examples. For example, a straight row of cameras all with their virtual optical axes perpendicular to plane 282 could be used in an arrangement similar to that shown in FIG. 10, except that the axes of the cameras will be perpendicular to the base plane. Multiple rows of cameras with their virtual optical axes perpendicular to plane 284 could also be used in an arrangement similar to that shown in FIGS. 16 and 17, except that the axes of the cameras will be perpendicular to base plane 282 in that figure. The angle of view of the camera is expanded to the point where it can view and render the desired scene from this far off axis position. The image on the camera's virtual detector plane is then calculated as if the virtual detector plane were receiving image from a pinhole located at the camera's "lens" position. This will produce an image without any distortion. This is the standard method of calculating ray traced images using virtual cameras in many computer programs.

When this rendering process occurs in most programs, a scene will result with a much wider field of view than that which is ultimately seen on the display, since the programs tend to automatically render a fields of view that extend equally to the left and right, or above and below, the optical axes of the virtual cameras. The field of view for the left camera 285 is represented by the rectangle 287 in FIG. 2. The field of view for the right camera 286 is represented by the rectangle 288. A much smaller area 289 of the scene proportionately subtends the same angles as the display itself does when seen by the observer at the ideal viewing position, and is centered on the scene to be displayed. This area 289 must be cropped out of each of the rendered larger images, 287 and 288. The cropped images 289 are then displayed on the display device. The cropped image will not require corrective distortion. Lines that are straight on the virtual plane 283 or anywhere above or below it will appear to be straight on the screen itself. Lines that are parallel on the virtual plane 283 or anywhere above or below it will appear to be parallel on the screen itself and objects will appear to have the correct proportions when the observer looks at the display from the best distance at the best off axis angle. Objects can be made to seem to extend above and below the screen.

Of course, if the rendering program allows it, it is better and faster to render only the small area 289 from the left camera position and from the right camera position.

Figure 20:
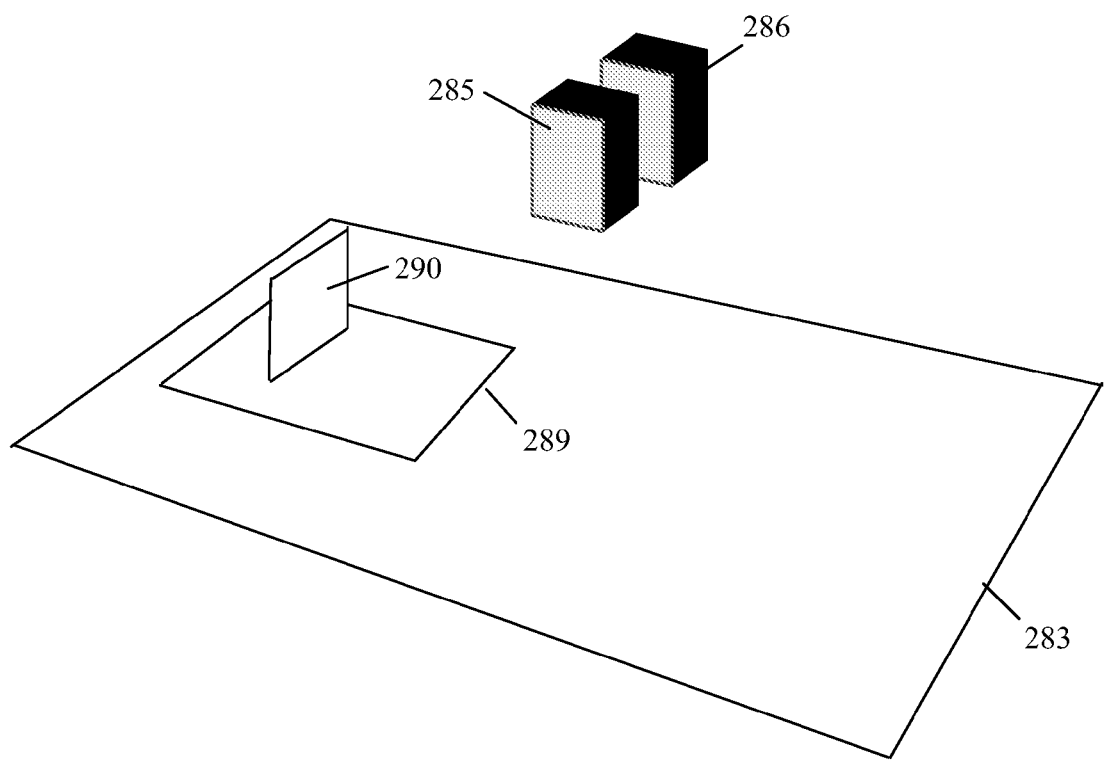
FIG. 20 is diagram of a way of displaying scenes designed for off axis 3D viewing

It is often desirable, when displaying 3D images for off axis viewing, to include normal 3D images, animations or movies (for example clips from 3D theatrical movies) that have been rendered or photographed with the intention of viewing them optimally from the area in front of a typical vertically oriented or nearly vertically screen. One way to display such scenes on a screen designed for off axis 3D viewing in such a way that they look natural is illustrated in FIG. 20, which is a perspective view of the same virtual camera and scene arrangement shown in FIGS. 14 and 15. In this particular example, a vertically oriented virtual flat surface 290 is created in the 3D scene. This flat surface is shown as a simple rectangle. It could also be the face of a cube or some other polygon, or even a slightly curved surface or polygon face. Another good orientation for this surface is tilted backward so that it's normal is pointed in the general direction of the cameras. However, it could theoretically have any orientation. The "normal" 3D image or animation is applied to this surface as two textures. This can be easily done in nearly all 3D rendering programs. The "left eye view" of the normal 3D scene is used as the texture when the scene is rendered through the eye point of the left camera 285 and the "right eye view" of the scene is used as the texture when the scene is rendered through the eye point of the right camera 286. The result is a scene in which the normal 3D images seem to be displayed on a "movie screen" extending in and or out of the display surface. This "movie screen" can be placed in the scene along with other 3D objects. It is possible to display more than one 3D scene on more than one flat or nearly flat surfaces within the same larger scene rendered for off axis viewing.

Although described with respect to a limited number of embodiments, the invention can be practiced in a variety of ways to produces 3D illusions from off-axis viewing perspectives. Various cameras, real or virtual, can be used for capturing offset images of a scene from off-axis perspectives, and various types of 3D displays can be used for displaying the images at similar off-axis perspectives. The required distortion of the offset images to account for the desired off-axis viewing can be accomplished by digital or analog means or by optics involved in their capture.

What is claimed is:

1. A system for displaying computer generated 3D images of a scene having a base plane and at least one object projecting from the base plane, comprising:
   a camera arrangement comprising a plurality of cameras, each of the cameras comprising:
      an eye point,
      an optical axis passing through the eye point, oriented perpendicular to the base plane;
      an image plane oriented parallel to the base plane; and
      a field of view including the at least one object;
   the camera arrangement being located at an offset position from the at least one object;
   such that each camera creates an offset image from an off-axis perspective, a line between the eye point and a center of the scene being inclined to a normal of the base plane of the scene;
   a display for displaying the offset images from the plurality of cameras in a form such that the offset images from each of the plurality of cameras is apparent to different eyes of an observer located in a position relative to the display such that the angle from which an observer views the display corresponds to the angle between the eye point and the center of the scene, providing an off-axis viewing perspective to the observer that is inclined to a normal of a surface of the display,
   wherein the offset images are rendered by means of calculating brightness and color values at a plurality of points on the image planes of each of the cameras, using virtual rays of light that pass between the scene and the image plane through the eye points of the cameras.

2. The system of claim 1 in which the display includes a light director for directing light emitted from the display along the off-axis viewing perspective.

3. The system of claim 2 in which the light director includes a light directing film associated with a light source of the display.

4. The system of claim 1 in which the display is a parallax display having an image-reproducing plane and an image separator, such that the image separator directs the offset images on the image-reproducing plane to the different eyes of the observer.

5. The system of claim 4 in which a spacing between the image-reproducing plane and the image separator is greater than a spacing for on-axis viewing.

6. The system of claim 4 in which a spacing between the image-reproducing plane and the image separator is varied between a top and bottom of the display, such that off-axis viewing angle variations from the top to the bottom of the display are accommodated.

7. The system of claim 1 in which:
   the camera arrangement comprises a plurality of pairs of cameras, each pair of cameras being oriented to capture an image from one of a plurality of offset positions, such that each pair of cameras captures an image from a different off-axis camera perspective; and the display further comprises a plurality of shutters, each of the plurality of shutters being located to interrupt the off-axis viewing perspective of an observer located at an position corresponding to a pair of cameras, the display displays the images from each of the pairs of cameras alternately; and each of the shutters are operated to pass the image from a pair of cameras to an observer located at an position corresponding to the pair of cameras only when the image from the pair of cameras is displayed, and to prevent the observer from seeing the images from other pairs of cameras.

8. The system of claim 7 in which the display is mounted in a horizontal orientation and the plurality of shutters are located at opposite sides of the display.

9. The system of claim 1 in which the display includes a projector and a screen that forms the surface of the display for displaying the offset images to observers.

10. The system of claim 9 in which the screen reflects the offset images to different viewing positions so that the offset images are apparent to the different eyes of the observer from the off-axis viewing perspective.

11. The system of claim 1 in which the plurality of cameras comprises a bank of cameras including three or more cameras aligned in a row or column.

12. The system of claim 11 in which the optical axes of the aligned cameras are parallel and offset in a direction of alignment of the row or column.

13. The system of claim 11 in which the bank of cameras includes a plurality of rows of cameras with a plurality of cameras in each of the rows.

14. The system of claim 1 wherein the offset images are cropped to cover a part of the base plane whose size and position relative to the cameras corresponds to a size and position of the display when the display is viewed from off axis.

15. The system of claim 1 wherein the offset images further comprise at least one inset image which was created for on-axis viewing, in which the inset image is rendered as textures on a surface of a virtual object within the scene that is being rendered for an off axis viewing perspective.

16. The system of claim 1 in which the cameras are virtual cameras.

17. The system of claim 1 in which the cameras are real cameras, and the eye point of each camera is a lens.

18. A projection system for displaying 3D images of a scene comprising at least one object located on a base plane, comprising:
    a) a plurality of projectors for projecting a plurality of offset images captured from off-axis camera perspectives;
    b) each of the offset images being captured by a camera comprising:
        an eye point,
        an optical axis passing through the eye point, oriented perpendicular to the base plane;
        an image plane oriented parallel to the base plane; and
        a field of view including the at least one object;
    the camera arrangement being located at an offset position relative to the at least one object;
    such that each camera creates an offset image from an off-axis perspective, a line between the eye point of the camera and a center of the scene being inclined to a normal of the base plane of the scene; and
    c) a screen positioned for receiving and displaying the offset images, such that the offset images are apparent to different eyes of an observer from an off-axis viewing perspective that is inclined to a normal of a surface of the screen.

19. The projection system of claim 18 in which the screen is reflective.

20. The projection system of claim 19 in which the screen comprises lenticular lenses and a reflective backing, such that light from the offset images projected on the screen are reflected toward the observer.

21. The projection system of claim 18 in which the plurality of projectors comprises two projectors for projecting a first pair and a second pair of offset images to the screen and the screen provides for displaying the first and second pairs of offset images at different first and second off-axis viewing perspectives.

22. The projection system of claim 21 in which the offset images vary by way of animation for displaying a changing scene to the observer.

23. The projection system of claim 18 in which the screen has a horizontal orientation and the viewing perspective is offset and elevated with respect to the screen so that the offset images appear to the observer to project vertically from the screen.

* * * * *